(12) United States Patent
Haramoto et al.

(10) Patent No.: US 11,952,068 B2
(45) Date of Patent: Apr. 9, 2024

(54) INTAKE SYSTEM

(71) Applicant: HONDA MOTOR CO., LTD., Tokyo (JP)

(72) Inventors: Takayuki Haramoto, Tokyo (JP); Hiroki Mori, Tokyo (JP); Satoshi Seo, Tokyo (JP); Yasunori Iwaya, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 17/703,322

(22) Filed: Mar. 24, 2022

(65) Prior Publication Data

US 2022/0315153 A1   Oct. 6, 2022

(30) Foreign Application Priority Data

Mar. 31, 2021 (JP) ................. 2021-061800

(51) Int. Cl.
| | |
|---|---|
| *F02M 35/10* | (2006.01) |
| *B01D 46/00* | (2022.01) |
| *B01D 46/10* | (2006.01) |
| *B62J 35/00* | (2006.01) |
| *B62J 40/10* | (2020.01) |
| *B62J 41/00* | (2020.01) |
| *F02M 35/02* | (2006.01) |

(52) U.S. Cl.
CPC .......... *B62J 40/10* (2020.02); *B01D 46/0046* (2013.01); *B01D 46/10* (2013.01); *B62J 35/00* (2013.01); *B62J 41/00* (2020.02); *F02M 35/0204* (2013.01); *F02M 35/10144* (2013.01); *F02M 35/10262* (2013.01); *B01D 2279/60* (2013.01)

(58) Field of Classification Search
CPC . B62J 40/10; B62J 35/00; B62J 41/00; B01D 46/0046; B01D 46/10; B01D 2279/60; F02M 35/0204; F02M 35/10144; F02M 35/10262
See application file for complete search history.

(56) References Cited

U.S. PATENT DOCUMENTS

| | | |
|---|---|---|
| 9,897,121 B1 | 2/2018 | Feltham |
| 2009/0090090 A1 | 4/2009 | Nishizawa et al. |
| 2015/0034405 A1 | 2/2015 | Abe et al. |

(Continued)

FOREIGN PATENT DOCUMENTS

| | | | | |
|---|---|---|---|---|
| DE | 100 50 210 A1 | 4/2002 | | |
| DE | 102015203185 A1 | * 8/2015 | ............. | B60K 13/02 |
| DE | 102016224486 A1 | * 4/2018 | ............. | B01D 45/12 |

(Continued)

OTHER PUBLICATIONS

Indian Office Action dated Oct. 19, 2022 issued in corresponding Indian application No. 202214018406; English machine translation included (6 pages).

(Continued)

*Primary Examiner* — Hung Q Nguyen
(74) *Attorney, Agent, or Firm* — Rankin, Hill & Clark LLP

(57) ABSTRACT

Intake efficiency in an intake system is improved. An intake system takes air through an air inlet duct extending from an air cleaner case, and includes a vortex generator that causes the flow of the intake air inside the air inlet duct to rotate around an axis of the air inlet duct.

12 Claims, 14 Drawing Sheets

(56) References Cited

U.S. PATENT DOCUMENTS

2016/0222928 A1 8/2016 Girondi
2021/0033049 A1 2/2021 Ohno et al.

FOREIGN PATENT DOCUMENTS

| | | | | |
|---|---|---|---|---|
| DE | 102017010537 A1 | * | 5/2018 | ............. B01D 45/12 |
| EP | 2832985 A1 | * | 2/2015 | ............. B62K 11/04 |
| JP | S54-60610 A | | 5/1979 | |
| JP | 2000-087815 | | 3/2000 | |
| JP | 4112701 B2 | * | 7/2008 | ............. F02B 61/02 |
| JP | 2009-85195 A | | 4/2009 | |
| JP | 2012-7489 A | | 1/2012 | |
| JP | 2015-45320 A | | 3/2015 | |
| JP | 2016-5135201 A | | 11/2016 | |
| JP | 2017-114377 A | | 6/2017 | |
| KR | 101950664 B1 | * | 2/2019 | |
| RU | 2 657 162 C1 | | 6/2018 | |
| WO | 2019/059257 A1 | | 3/2019 | |
| WO | WO-2019096739 A1 | * | 5/2019 | ......... F20M 35/0204 |
| WO | 2019/159701 A1 | | 8/2019 | |

OTHER PUBLICATIONS

Japanese Office Action dated Sep. 12, 2023 issued in corresponding Japanese application No. 2022-057620; English translation included (9 pages).

* cited by examiner

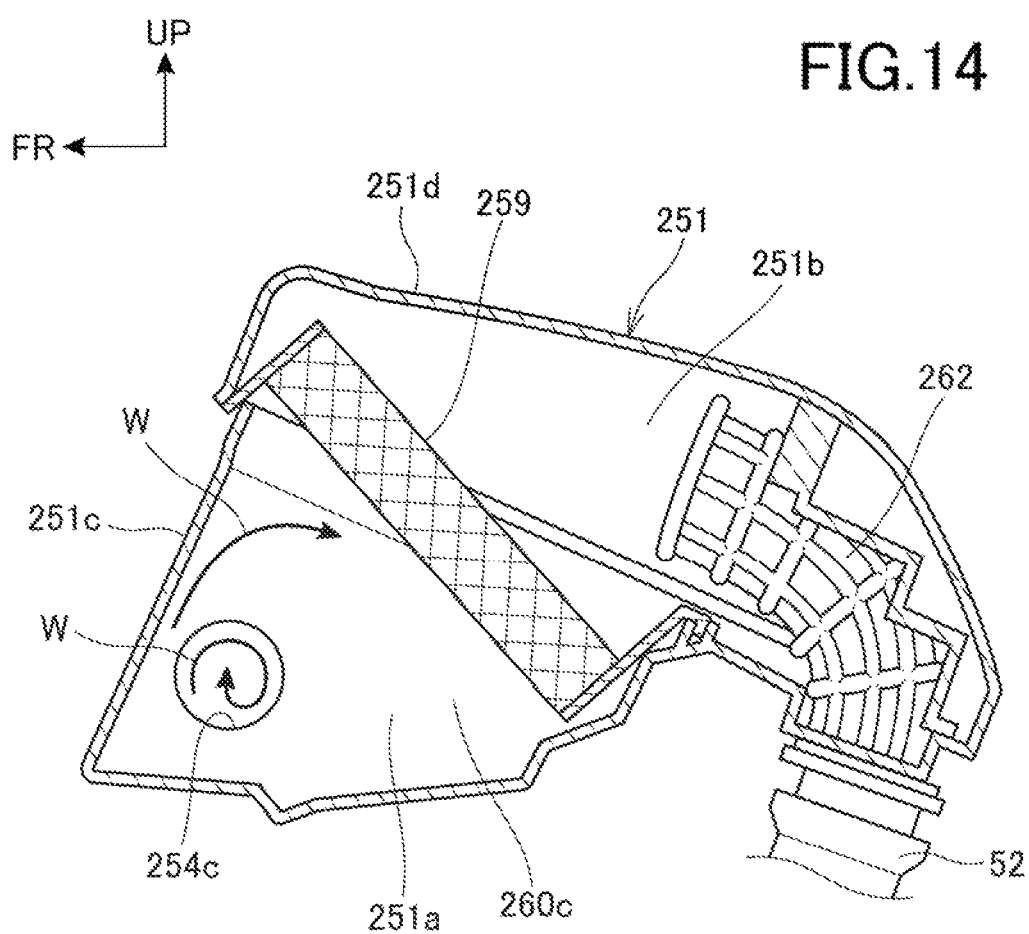

INTAKE SYSTEM

INCORPORATION BY REFERENCE

The present application claims priority under 35 U.S.C. § 119 to Japanese Patent Application No. 2021-061800 filed on Mar. 31, 2021. The content of the application is incorporated herein by reference in its entirety.

BACKGROUND OF THE INVENTION

Field of the Invention

The present invention relates to an intake system.

Description of the Related Art

An intake system that has been known in the art includes an air cleaner case and an air inlet duct extending from the air clearer case toward a vehicle front side, the system causing air taken from an opening in the front surface of the air inlet duct to flow through the air inlet duct toward a vehicle rear side (for example, see Japanese Patent Laid-Open No. 2000-87815). The technique of Japanese Patent Laid-Open No. 2000-87815 can take air into the air cleaner case using the flow of running wind.

Meanwhile, such an intake system is desired to improve its intake efficiency.

It is an object of the present invention to improve intake efficiency in an intake system.

SUMMARY OF THE INVENTION

An intake system that takes air through an air inlet duct extending from an air cleaner case includes a vortex generator that causes the flow of the intake air inside the air inlet duct to rotate around the axis of the air inlet duct.

Intake efficiency in the intake system can be improved.

BRIEF DESCRIPTION OF THE DRAWINGS

FIG. 14 is a view of the schematic internal structure of the air cleaner case when viewed from the left side.

DETAILED DESCRIPTION OF THE PREFERRED EMBODIMENTS

Figure 1:
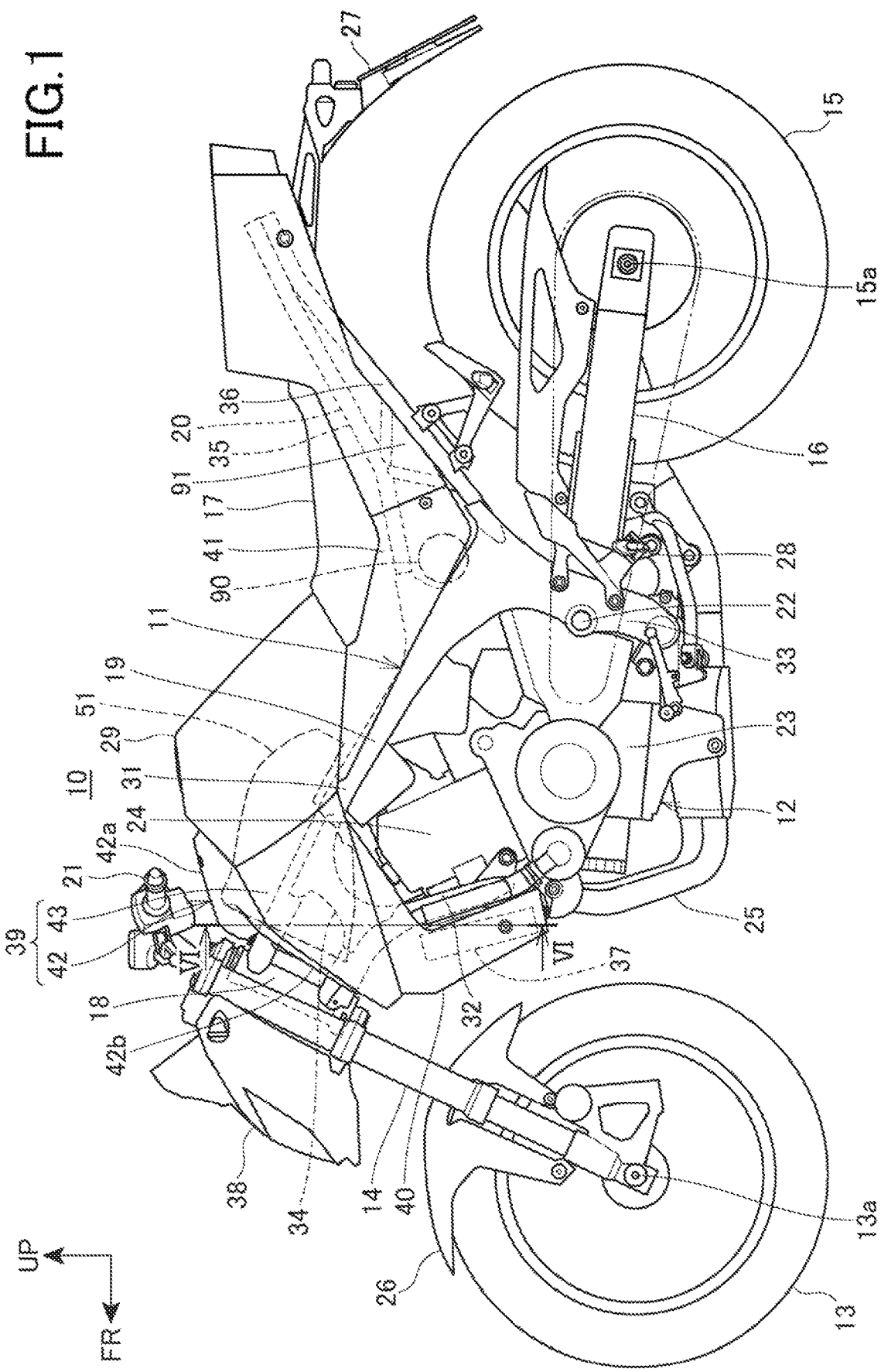
FIG. 1 is a side view of a saddle-ride vehicle according to one embodiment of the present invention.

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The front frame 19 includes a pair of left and right main frames 31 extending downward and rearward from the upper portion of the head pipe 18, a pair of left and right down frames 32 extending downward and rearward from the lower portion of the head pipe 18, a pair of left and right pivot frames 33 each of which extends from a rear end portion of the corresponding main frame 31, and a gusset 34 connecting the main frames 31 to the down frames 32 on a rear side of the head pipe 18.

The rear frame 20 includes a pair of left and right seat frames 35 each of which extends upward and rearward from a rear end portion of the corresponding main frame 31, and a pair of left and right sub frames 36 each of which extends upward and rearward from an upper end portion of the corresponding pivot frame 33 and each of which is connected to a rear end portion of the corresponding seat frame 35.

The power unit 12 is disposed below the main frames 31 between the down frames 32 and the pivot frames 33.

The cylinder 24 extends upward from the upper surface of the front portion of the crankcase 23.

The fuel tank 29 is disposed above the main frames 31 between the seat 17 and the head pipe 18 in a vehicle front-rear direction. The fuel tank 29 is supported on the main frames 31.

A radiator 37 through which cooling water of the power unit 12 passes is disposed before the cylinder 24 and the down frames 32 and attached to the down frames 32. The radiator 37 is plate-shaped and disposed so that its thickness direction coincides with the vehicle front-rear direction.

Figure 2:
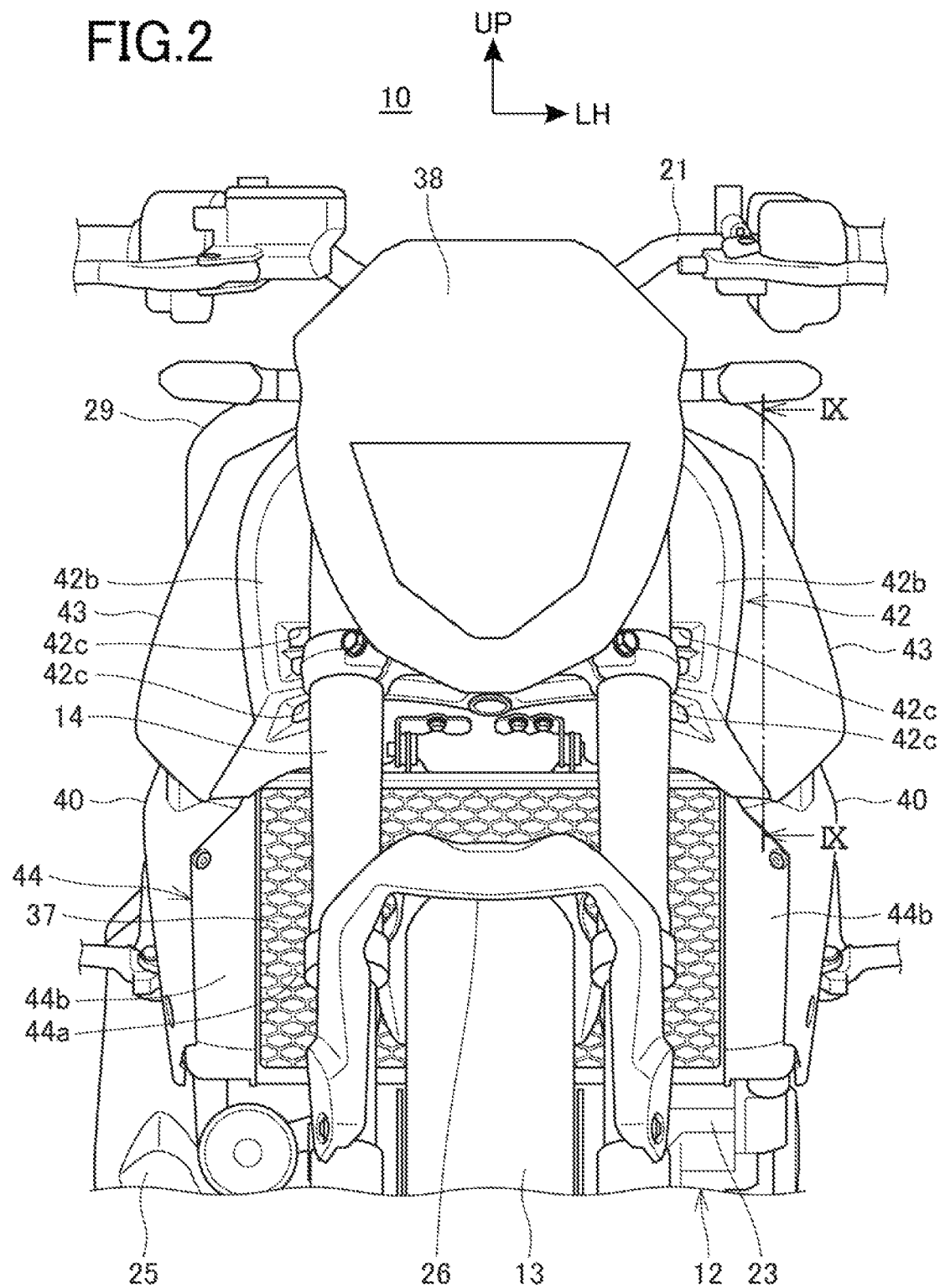
FIG. 2 is a front view of the saddle-ride vehicle when viewed from a front side.

FIG. 2 is a front view of the saddle-ride vehicle 10 when viewed from a front side.

Referring to FIGS. 1 and 2, the saddle-ride vehicle 10 includes, as a vehicle body cover, a front cover 38 covering the head pipe 18 from the front side, a tank cover 39 covering the fuel tank 29 from the front side, a pair of left and right radiator shrouds 40 each covering the radiator 37 from an outer side in the vehicle width direction, and a pair of left and right side covers 41 each covering a portion of the vehicle body below the seat 17 from the outer side in the vehicle width direction.

The tank cover 39 includes a first tank cover 42 covering the fuel tank 29 from the front side and a pair of left and right second tank covers 43 disposed behind the first tank cover 42 and before the fuel tank 29.

The first tank cover 42 includes an upper surface portion 42a disposed between the fuel tank 29 and the head pipe 18 and covering the front end portions of the main frames 31 from above. The upper surface portion 42a is disposed in a central portion in the vehicle width direction. The first tank cover 42 also includes a pair of left and right lower extensions 42b respectively extending downward from the left and right sides of the upper surface portion 42a.

The second tank covers 43 are provided separately from the first tank cover 42. Each of the second tank covers 43 is disposed between the corresponding lower extension 42b and the front edge of the fuel tank 29 when viewed from a vehicle side, and covers the front end portion of the vehicle from the outer side in the vehicle width direction.

The radiator 37 is disposed below the tank cover 39. The radiator 37 straddles the front wheel 13 from side to side and extends in the vehicle width direction when viewed from the front side.

The saddle-ride vehicle 10 includes a radiator grill 44 covering the front surface of the radiator 37 from the front side.

Figure 3:
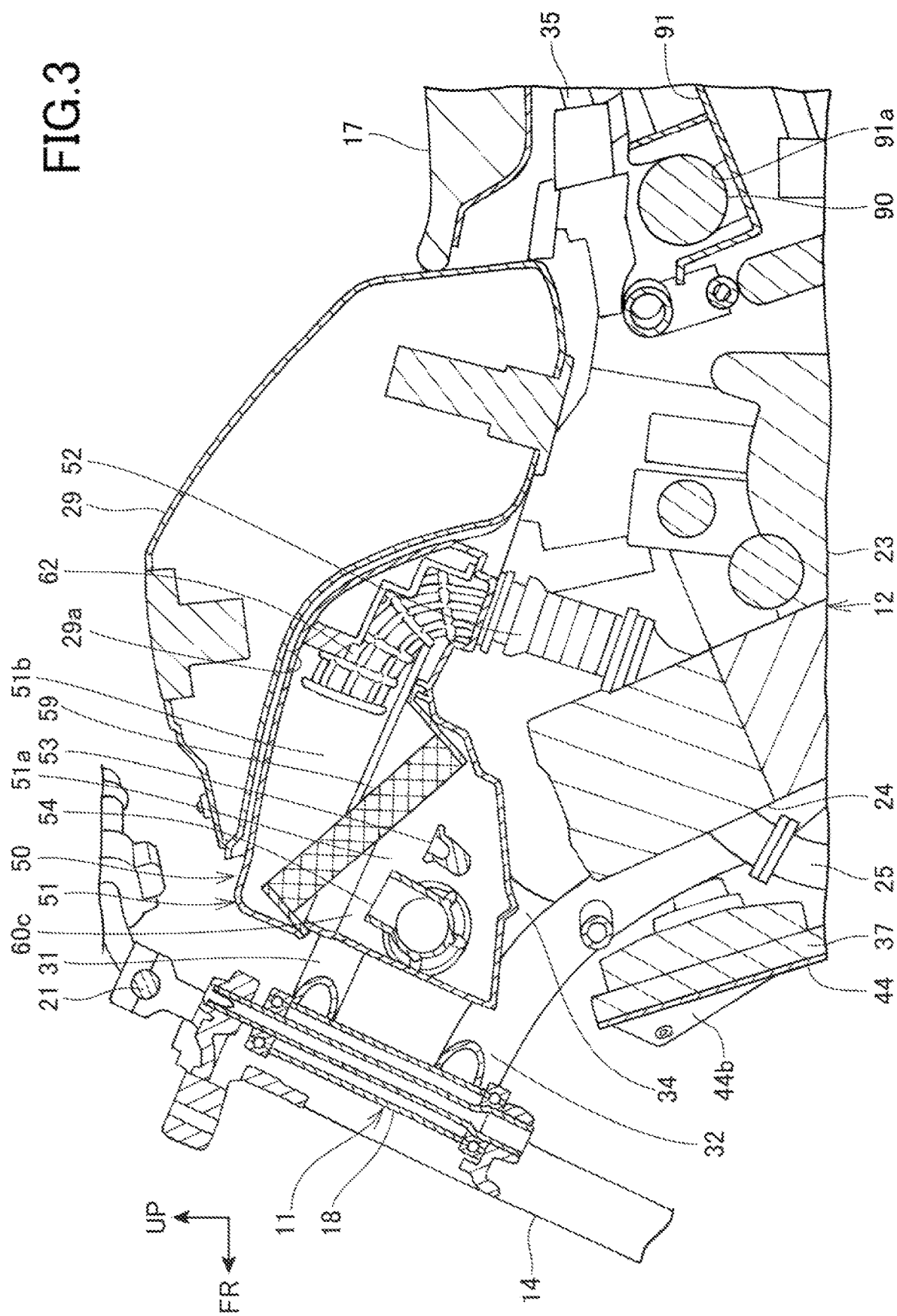
FIG. 3 is a cross-sectional view of the saddle-ride vehicle taken along its central portion in a vehicle width direction.

FIG. 3 is a cross-sectional view of the saddle-ride vehicle 10 taken along its central portion in the vehicle width direction.

Referring to FIGS. 1 and 3, the fuel tank 29 includes a step 29a formed by upwardly recessing the front lower surface of the fuel tank 29 in step form.

The saddle-ride vehicle 10 includes an intake system 50 that supplies the cylinder 24 with intake air.

Figure 4:
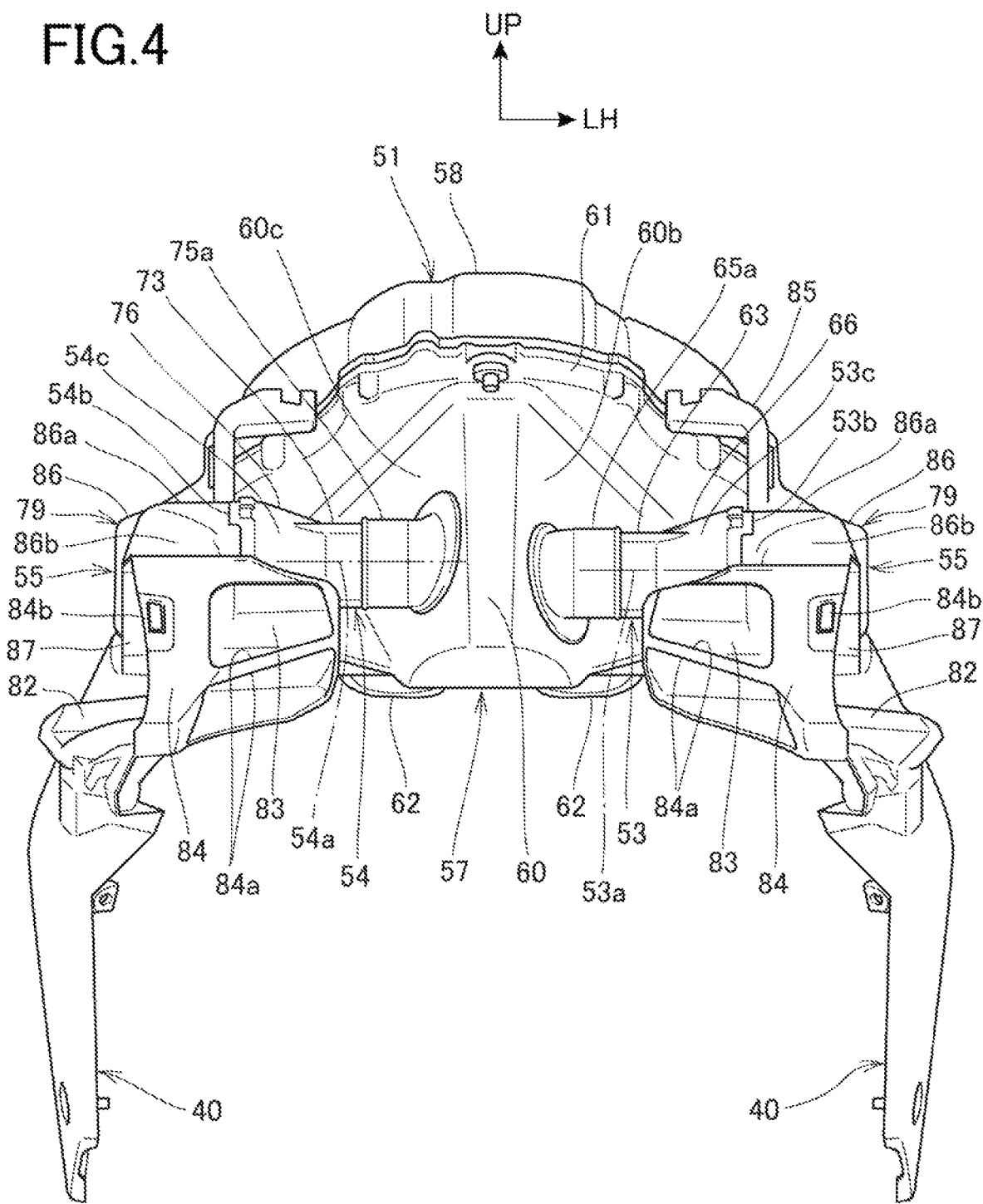
FIG. 4 is a front view of the intake system when viewed from the front side.

FIG. 4 is a front view of the intake system 50 when viewed from the front side.

Referring to FIGS. 3 and 4, the intake system 50 includes an air cleaner case 51 that purifies intake air, a pair of left and right throttle devices 52 that regulate the amount of the intake air to be supplied to the cylinder 24, a pair of left and right air inlet ducts 53 and 54 that send the intake air to the air cleaner case 51, and vortex generators 55 that cause flows of the intake air inside the air inlet ducts 53 and 54 to swirl. Each vortex generator 55 is disposed at the corresponding radiator shroud 40. The throttle devices 52 are not shown in FIG. 4.

Each throttle device 52 has an upstream end connected to the air cleaner case 51 and a downstream end connected to an intake port disposed at the rear surface of the cylinder 24.

The air cleaner case 51 is formed into a hollow case by coupling of a case body 57 and a lid portion 58 that are separately provided in the up-down direction. The air cleaner case 51 includes therein an air filter 59 that purifies intake air.

The air cleaner case 51 is disposed between the head pipe 18 and the fuel tank 29 in the vehicle front-rear direction. The air cleaner case 51 is disposed between the left and right main frames 31 in the vehicle width direction. The rear portion of the air cleaner case 51 is disposed on the step 29a of the fuel tank 29 and covered with the front portion of the fuel tank 29 from above.

Figure 5:
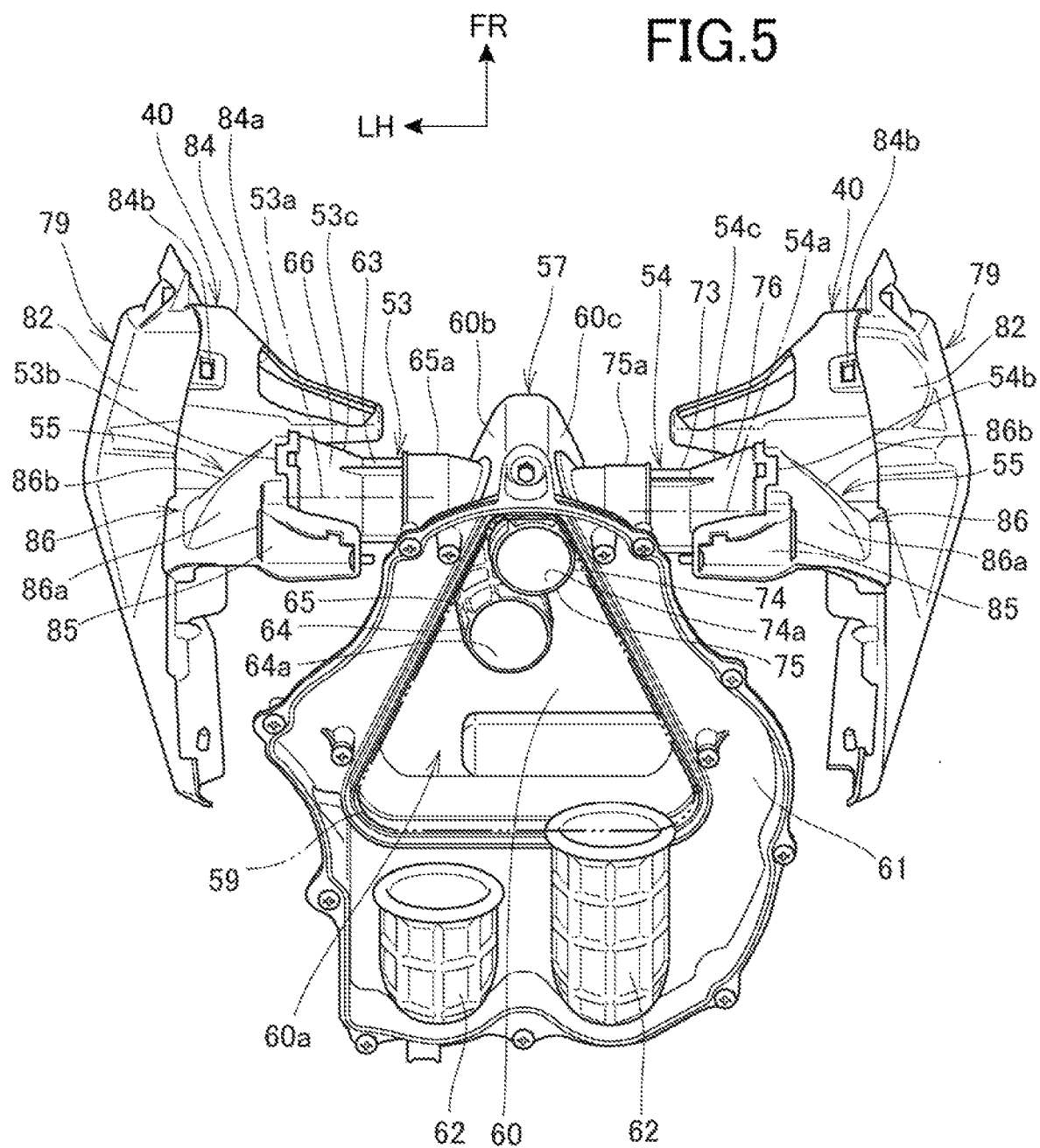
FIG. 5 is a view of the intake system when viewed from above with a lid portion being removed.

FIG. 5 is a view of the intake system 50 from above with the lid portion 58 being removed.

The case body 57 includes a box-shaped portion 60 whose upper surface is open and a flange portion 61 extending from the upper edge of the box-shaped portion 60 toward the front, left, right, and rear sides. The flange portion 61 is plate-shaped to surround the box-shaped portion 60 from its periphery.

The lid portion 58 is attached to the case body 57 by fastening of the edge of the lid portion 58 to the edge of the flange portion 61.

The air inlet ducts 53 and 54 are connected to the box-shaped portion 60.

The air filter 59 is a plate-shaped member sealing an opening 60a in the upper surface of the box-shaped portion 60 and is attached to the opening 60a.

The air filter 59 divides the space inside the air cleaner case 51 in the up-down direction.

The space of the box-shaped portion 60 below the air filter 59 is a dirty side 51a where the intake air that has not passed through the air filter 59 flows in (FIG. 3). In the interior of the air cleaner case 51, the space above the air filter 59 is a clean side 51b where the intake air that has passed through the air filter 59 flows in (FIG. 3).

In plan view, the box-shaped portion 60 is formed into a substantially triangular shape that is tapered toward the vehicle front side. That is to say, the dirty side 51a is a chamber with a substantially triangular shape.

In plan view, the box-shaped portion 60 has left and right side walls 60b and 60c which incline so that the interval between them increases toward the rear side.

The air cleaner case 51 includes a pair of left and right supply ducts 62 each connected to a corresponding one of the throttle devices 52.

Each supply duct 62 extends downwardly from the rear portion of the clean side 51b through the rear portion of the flange portion 61. Each supply duct 62 has a lower end that is a downstream end connected to the corresponding throttle device 52.

Figure 6:
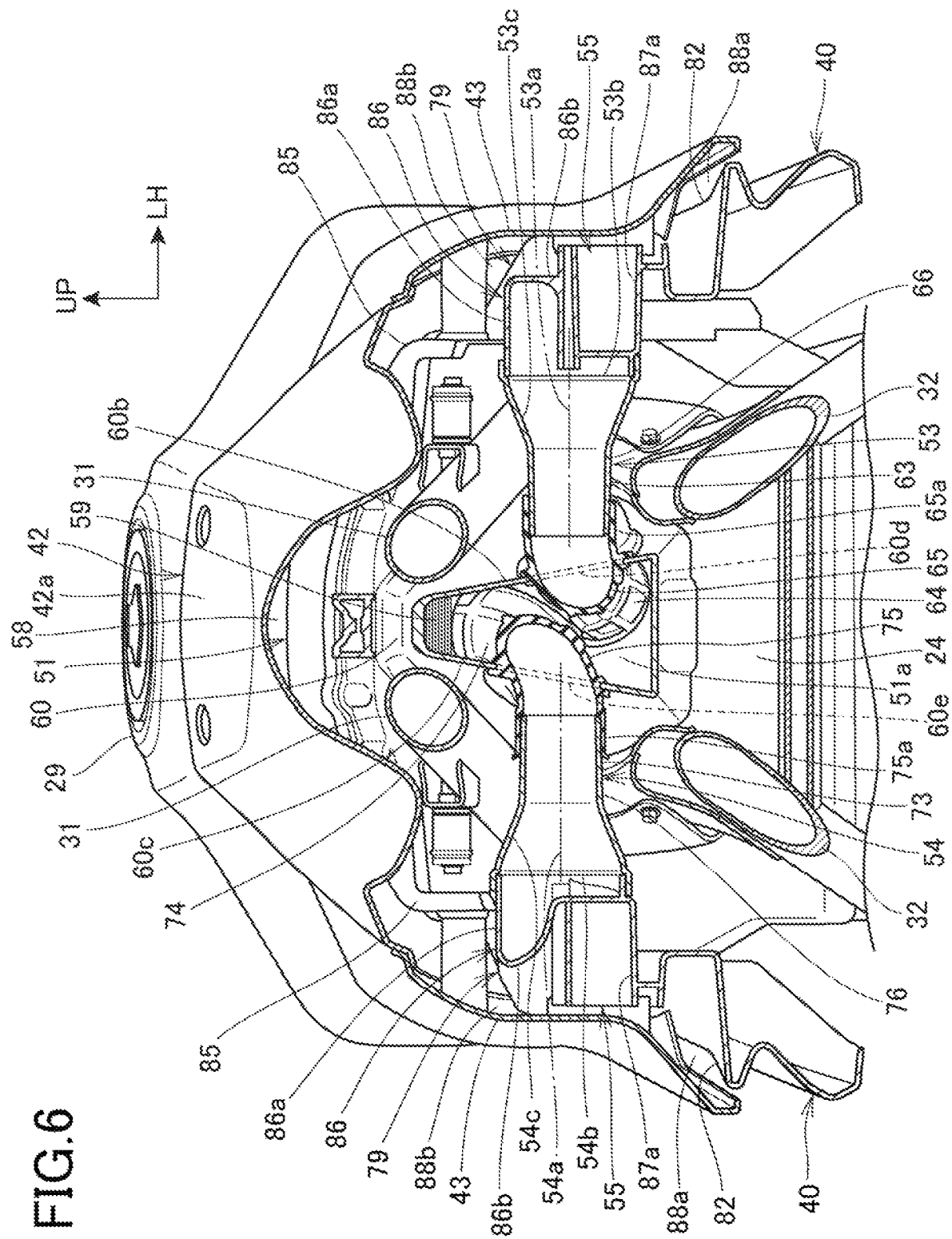
FIG. 6 is a cross-sectional view taken along line VI-VI of FIG. 1.

FIG. 6 is a cross-sectional view taken along line VI-VI of FIG. 1.

Referring to FIGS. 4 to 6, the air inlet duct 53 on one (the left) of the left and right sides extends outward in the vehicle width direction from the air cleaner case 51. Specifically, the air inlet duct 53 extends outward in the vehicle width direction from a front end portion of the left side wall 60b of the case body 57.

The side wall 60b is provided with a duct connection opening 60d to which the air inlet duct 53 is mated and connected. The air inlet duct 53 passes through the duct connection opening 60d to enter the air cleaner case 51.

The air inlet duct 53 includes: an outer duct portion 63 extending outward from the air cleaner case 51; and an inner duct portion 64 connected to the outer duct portion 63 and extending inside the air cleaner case 51.

The outer duct portion 63 extends outward in the vehicle width direction from the duct connection opening 60d.

The inner duct portion 64 extends rearward and upward from the duct connection opening 60d in the dirty side 51a. The inner duct portion 64 has an upper end that is a downstream end 64a opening toward the air filter 59 positioned thereabove.

The air inlet duct 53 includes a first duct member 65 connected to the duct connection opening 60d and a second duct member 66 connected to the first duct member 65.

The first duct member 65 forms the inner duct portion 64.

The first duct member 65 has an upstream end portion 65a extending outward in the vehicle width direction from the duct connection opening 60d. The second duct member 66 mates to the inner circumference of an end portion 65a of the first duct member 65, and extends outward in the vehicle width direction from the end portion 65a. Thus, the outer duct portion 63 is formed by the end portion 65a of the first duct member 65 and the second duct member 66.

The air inlet duct 53 is a pipe with a circular cross-section.

In the outer duct portion 63, an axis 53a of the air inlet duct 53 extends linearly in the vehicle width direction. Outside the air cleaner case 51, the axis 53a of the air inlet duct 53 extends in the vehicle width direction, and thus, viewing from the vehicle side is viewing along an axial direction of the air inlet duct 53.

The air inlet duct 53 has an upstream end that is an intake opening 53b opening outward in the vehicle width direction. The intake opening 53b is the outer end of the outer duct portion 63 in the vehicle width direction.

The upstream end portion of the air inlet duct 53 is provided with a tapered portion 53c having an inner diameter decreasing toward the downstream side from the intake opening 53b.

The air inlet duct 54 on the other (right) of the left and right side extends outward in the vehicle width direction from the air cleaner case 51. Specifically, the air inlet duct 54 extends outward in the vehicle width direction from a front end portion of the right side wall 60c of the case body 57.

The side wall 60c is provided with a duct connection opening 60e to which the air inlet duct 54 is mated and connected. The air inlet duct 53 passes through the duct connection opening 60e to enter the air cleaner case 51.

The air inlet duct 54 includes: an outer duct portion 73 extending outward from the air cleaner case 51; and an inner duct portion 74 connected to the outer duct portion 73 and extending inside the air cleaner case 51.

The outer duct portion 73 extends outward in the vehicle width direction from the duct connection opening 60e.

The inner duct portion 74 extends rearward and upward from the duct connection opening 60e in the dirty side 51a. The inner duct portion 74 has an upper end that is a downstream end 74a opening toward the air filter 59 positioned thereabove.

The air inlet duct 54 includes a first duct member 75 connected to the duct connection opening 60e and a second duct member 76 connected to the first duct member 75.

The first duct member 75 forms the inner duct portion 74.

The first duct member 75 has an upstream end portion 75a extending outward in the vehicle width direction from the duct connection opening 60e. The second duct member 76 mates to the inner circumference of an end portion 75a of the first duct member 75, and extends outward in the vehicle width direction from the end portion 75a. Thus, the outer duct portion 73 is formed by the end portion 75a of the first duct member 75 and the second duct member 76.

The air inlet duct 54 is a pipe with a circular cross-section.

In the outer duct portion 73, an axis 54a of the air inlet duct 54 extends linearly in the vehicle width direction.

The air inlet duct 54 has an upstream end that is an intake opening 54b opening outward in the vehicle width direction. The intake opening 54b is the outer end of the outer duct portion 73 in the vehicle width direction.

The upstream end portion of the air inlet duct 54 is provided with a tapered portion 54c having an inner diameter decreasing toward the downstream side from the intake opening 54b.

The duct connection openings 60d and 60e of the air cleaner case 51 face each other. In other words, when viewed from the vehicle side, the duct connection openings 60d and 60e at least partially overlap each other.

The downstream end 64a of the left inner duct portion 64 and the downstream end 74a of the right inner duct portion 74 are disposed in an offset manner in the front-rear direction.

Figure 7:
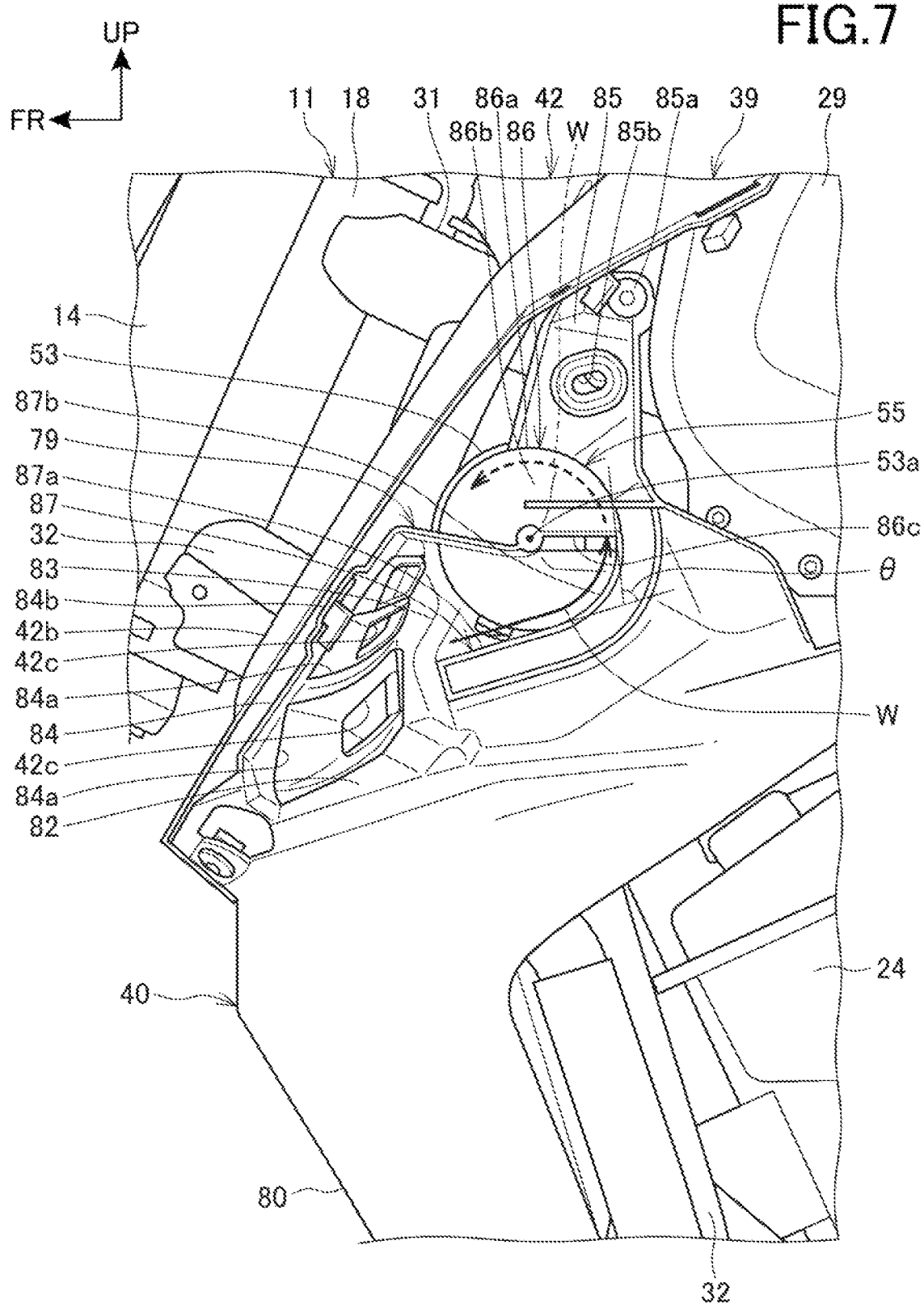
FIG. 7 is a left side view of the front portion of the saddle-ride vehicle with a second tank cover being removed.

FIG. 7 is a left side view of the front portion of the saddle-ride vehicle 10 with the second tank cover 43 being removed.

Referring FIGS. 2 and 7, the lower extension 42b of the first tank cover 42 extends in the up-down direction on the outer side of the main frame 31 and of the down frame 32. The lower extension 42b is plate-shaped so as to cover the side of the fuel tank 29 from the front side.

The lower extension 42b has a lower portion provided with a cover aperture 42c opening forward.

Referring to FIGS. 1 and 7, the second tank cover 43 (FIG. 1) covers the upper portion of the radiator shroud 40 from the outer side in the vehicle width direction.

The upper portion of the left radiator shroud 40 serves as a wind guide 79 that guides running wind. The radiator shroud 40 includes a shroud portion 80 extending downward from the front portion of the wind guide 79. The shroud portion 80 is a plate-shaped cover covering the radiator 37 from the outer side in the vehicle width direction.

Figure 8:
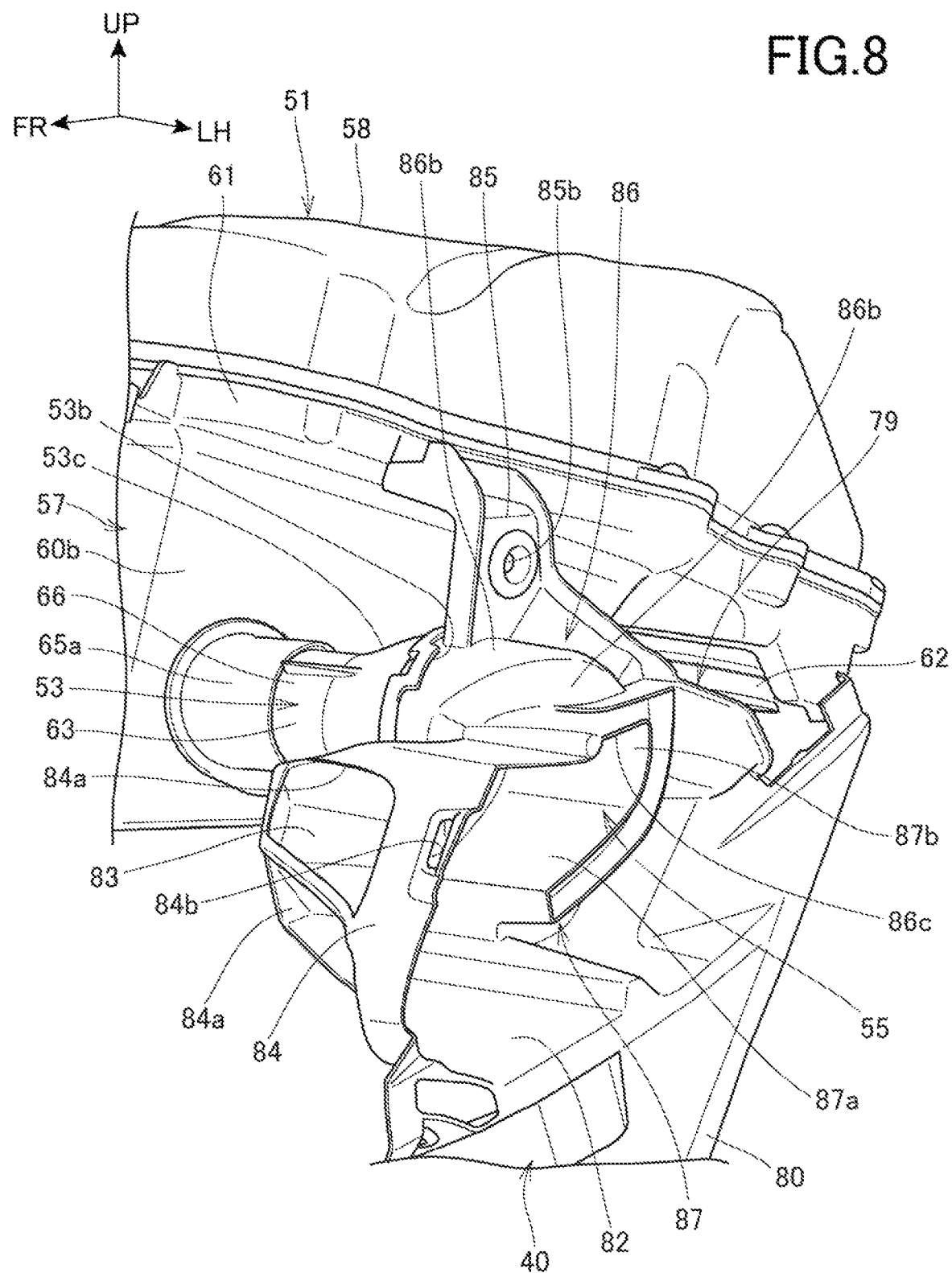
FIG. 8 is a perspective view of a wind guide and an air cleaner case when viewed from a left front side.
Figure 9:
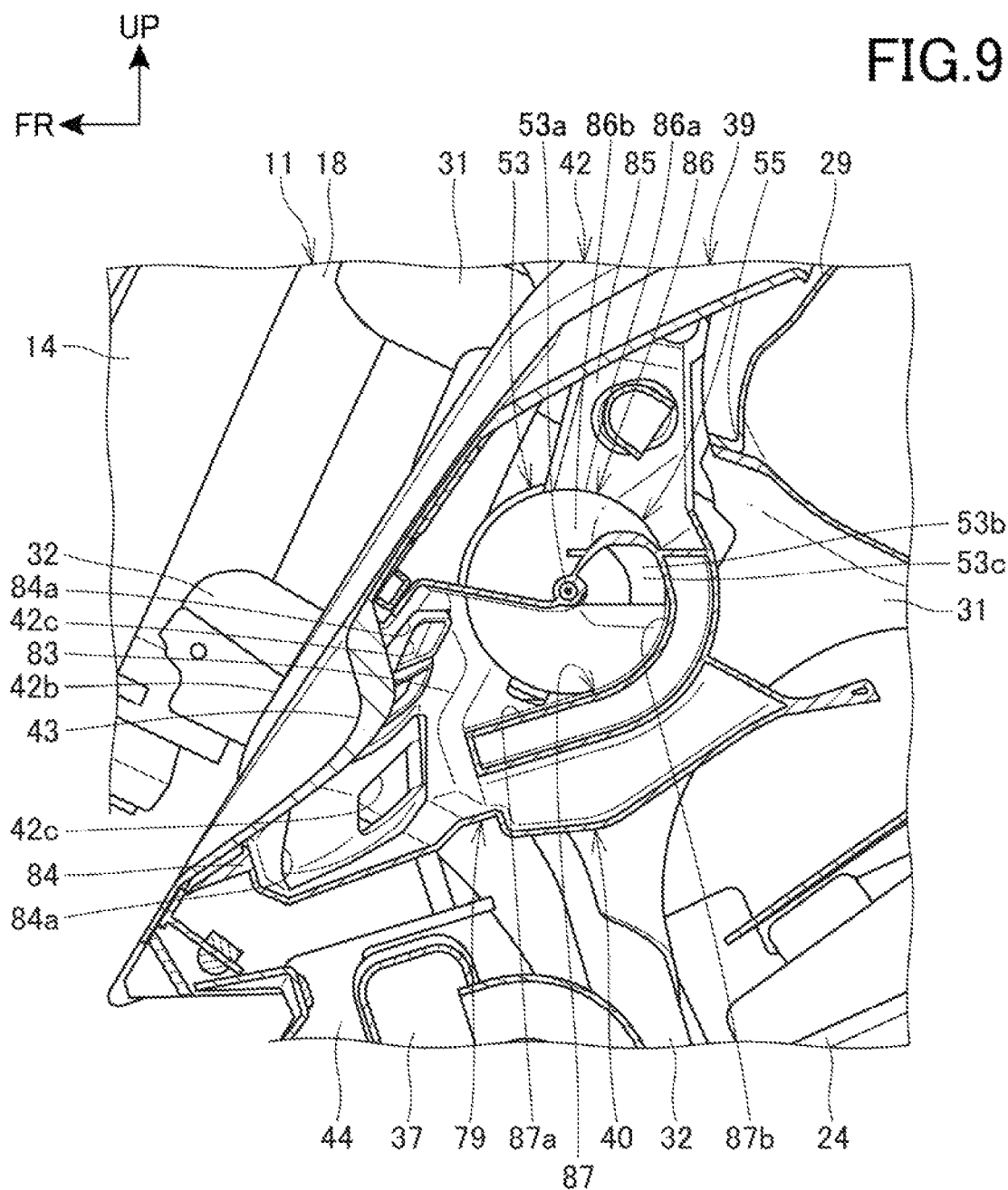
FIG. 9 is a cross-sectional view taken along line IX-IX of FIG. 2.

FIG. 8 is a perspective view of the wind guide 79 and the air cleaner case 51 from the left front side. FIG. 9 is a cross-sectional view taken along line IX-IX of FIG. 2.

Referring to FIGS. 4 to 9, the wind guide 79 covers the front end portion of the vehicle body frame 11, the front end portion of the air cleaner case 51, the air inlet duct 53, and other components from the outer side in the vehicle width direction.

The wind guide 79 integrally includes: the vortex generator 55 causing the intake air flowing through the air inlet duct 53 to swirl; a bottom wall 82 positioned below the vortex generator 55 and extending in the vehicle front-rear direction; a front wall 83 positioned before the vortex generator 55 and extending in the up-down direction; a partition wall 84 positioned before the front wall 83 and extending in the up-down direction; and a mount 85 extending upward from the vortex generator 55.

The bottom wall 82 is a plate-shaped portion extending inward in the vehicle width direction from the upper edge of the shroud portion 80. The bottom wall 82 inclines rearward and upward when viewed from the vehicle side.

The vortex generator 55 covers the intake opening 53b of the air inlet duct 53 from the outer side in the vehicle width direction. The vortex generator 55 is disposed above the bottom wall 82.

The vortex generator 55 is disposed at the intake opening 53b of the air inlet duct 53. The vortex generator 55 includes a bulge 86 bulging outward in the vehicle width direction from the upper portion of the intake opening 53b of the air inlet duct 53, and a guide 87 disposed below the bulge 86. Here, the upper portion of the intake opening 53b is the upper half of the intake opening 53b when viewed from the vehicle side.

The bulge 86 includes an arc peripheral wall 86a along the inner circumference of the upper portion of the intake opening 53b, and a side wall 86b (slope) covering, from the outer side in the vehicle width direction, an opening formed by the peripheral wall 86a when viewed from the vehicle side. The side wall 86b covers the upper portion of the intake opening 53b from the outer side in the vehicle width direction.

The peripheral wall 86a extends outward in the vehicle width direction from the upper half of the intake opening 53b. The peripheral wall 86a mates to the upper portion of the inner circumference of the intake opening 53b. The peripheral wall 86a may mate to the entire circumference of the intake opening 53b.

The side wall 86b slopes outward in the vehicle width direction as it goes toward the rear side from the front end of the bulge 86.

The lower surface of the rear portion of the bulge 86 is provided with an inlet aperture 86c opening downward. The inlet aperture 86c allows the space inside the bulge 86 to communicate with a space at the lower outer side of the bulge 86.

The guide 87 is disposed above the bottom wall 82.

The guide 87 includes: a first guide wall 87a extending in the vehicle front-rear direction at a lower side relative to the inlet aperture 86c; and a second guide wall 87b connecting the rear end of the first guide wall 87a to the rear end portion of the inlet aperture 86c.

When view from the vehicle side, the first guide wall 87a is positioned before and below the inlet aperture 86c and extends linearly in the vehicle front-rear direction in a back-up posture.

When view from the vehicle side, the second guide wall 87b extends upward and rearward from the rear end of the first guide wall 87a, and has an upper end connected to the rear end portion of the inlet aperture 86c from below.

The second guide wall 87b is arc-shaped along the inner circumference of the intake opening 53b when viewed from the vehicle side.

The upper end portion of the second guide wall 87b has a slope angle θ of 70° or more relative to the first guide wall 87a when viewed from the vehicle side, and the inlet aperture 86c opens toward the lower side so as to be horizontal to the ground when viewed from the vehicle side.

The lower side to which the inlet aperture 86c opens is one of upper and lower sides relative to the vortex generator 55.

The mount 85 extends from the vortex generator 55 toward the upper side that is the other of the upper and lower sides.

The upper end portion of the mount 85 is fastened to the vehicle body with a fastener 85a. The mount 85 includes an engaging portion 85b which is positioned below the fastener 85a and with which the second tank cover 43 is engaged.

The front wall 83 extends inward in the vehicle width direction from a portion near the front end portion of the first guide wall 87a. The front wall 83 connects the front end portion of the bulge 86 to the bottom wall 82 in the up-down direction.

The partition wall 84 covers the front wall 83 from the front side. The partition wall 84 connects the front end portion of the bulge 86 to the front end portion of the bottom wall 82 in the up-down direction.

The partition wall 84 includes an opening 84a penetrating the partition wall 84 in the front-rear direction. The partition wall 84 also includes an engaging portion 84b with which the lower extension 42b of the first tank cover 42 is engaged.

The engaging portion 84b is disposed outside the opening 84a in the vehicle width direction. The opening 84a overlaps the front wall 83 from the front side.

The right radiator shroud 40 is substantially symmetrical to the left radiator shroud 40, and thus, the specific description of the right radiator shroud 40 will not be described.

The vortex generator 55 in the right radiator shroud 40 is connected to the intake opening 54b of the right air inlet duct 54.

With reference to FIGS. 4 to 9, the flow of the intake air passing through the intake system 50 will be described.

The running wind of the saddle-ride vehicle 10 flows into the tank cover 39 via the cover aperture 42c from the front side. The running wind flowing into the tank cover 39 passes through the opening 84a of the partition wall 84, moves rearward, and flows rearward and outward in the vehicle width direction along the front wall 83. Part of the running wind flows in the vortex generator 55 as intake air W (FIG. 7).

In the left vortex generator 55, the intake air W flows upward and rearward along the upper surface of the first guide wall 87a, and then, arcuately flows upward and rearward along the upper surface of the second guide wall 87b to flow into the inlet aperture 86c.

Since the slope angle θ is 70° or more, the intake air W flows on the first guide wall 87a and the second guide wall 87b, thereby changing its flow direction by 70° or more when viewed from the vehicle side.

The intake air W that has flowed into the inlet aperture 86c flows arcuately along the peripheral wall 86a and the side wall 86b inside the bulge 86.

That is to say, the intake air W passes through the vortex generator 55 to be a vortex rotating around the axis 53a of the air inlet duct 53 when viewed from the vehicle side.

In the vortex generator 55, the intake air W flows rearward and then flows upward to rotate, and thus, it rotates counterclockwise when viewed from the vehicle side.

The side wall 86b of the bulge 86 is a slope inclining inward in the vehicle width direction along the rotation direction of the intake air W. Therefore, the intake air W flowing in the bulge 86 flows inward in the vehicle width direction along an axial direction of the air inlet duct 53 while rotating counterclockwise.

Similarly, the right vortex generator 55 also causes the intake air W (now shown) to be a vortex rotating around the axis 54a of the air inlet duct 54 when viewed from the vehicle side. The intake air W generated in the right vortex generator 55 rotates clockwise when viewed from the right side of the vehicle. In other words, the vortexes of the intake air W generated in the left and right vortex generators 55 rotate counterclockwise when viewed from the left side of the vehicle like FIG. 7, and thus, the rotation directions of the vortexes generated in the respective left and right vortex generators 55 are the same.

The intake system 50 causes the flow of the intake air W inside each of the air inlet ducts 53 and 54 to be a vortex rotating around the corresponding one of the axes 53a and 54a, thereby increasing the flow rate of the intake air W. This can improve intake efficiency in the intake system 50.

In each of the tapered portions 53c and 54c of the air inlet ducts 53 and 54, the inner diameter of each of the air inlet ducts 53 and 54 decreases toward the downstream side. As a result, the intake air W increases its flow rate after passing through each of the tapered portions 53c and 54c.

The intake air W advances inside the air inlet duct 53 while swirling, and flows from the downstream end 64a of the inner duct portion 64 into the dirty side 51a.

In addition, the intake air W advances inside the air inlet duct 54 while swirling, and flows from the downstream end 74a of the inner duct portion 74 into the dirty side 51a.

The rotation direction of the vortex flowing from the downstream end 64a into the dirty side 51a is the same as that of the vortex flowing from the downstream end 74a into the dirty side 51a. This can promote rotations of the vortexes of the intake air W.

The intake air W passes through the air filter 59 from the dirty side 51a to flow into the clean side 51b, and passes through the supply ducts 62 and the throttle devices 52 to flow into the cylinder 24.

Referring to FIG. 6, the tank cover 39 includes therein: a lower passage 88a between the inner surface of the second tank cover 43 and the outer end portion of the bottom wall 82; and an upper passage 88b between the inner surface of the second tank cover 43 and the upper portion of the wind guide 79. The upper passage 88b is above the vortex generator 55.

Part of the running wind flowing into the tank cover 39 from the cover aperture 42c passes through the lower passage 88a and the upper passage 88b and is exhausted rearward. This enables the running wind to efficiently flow into the tank cover 39.

Figure 10:
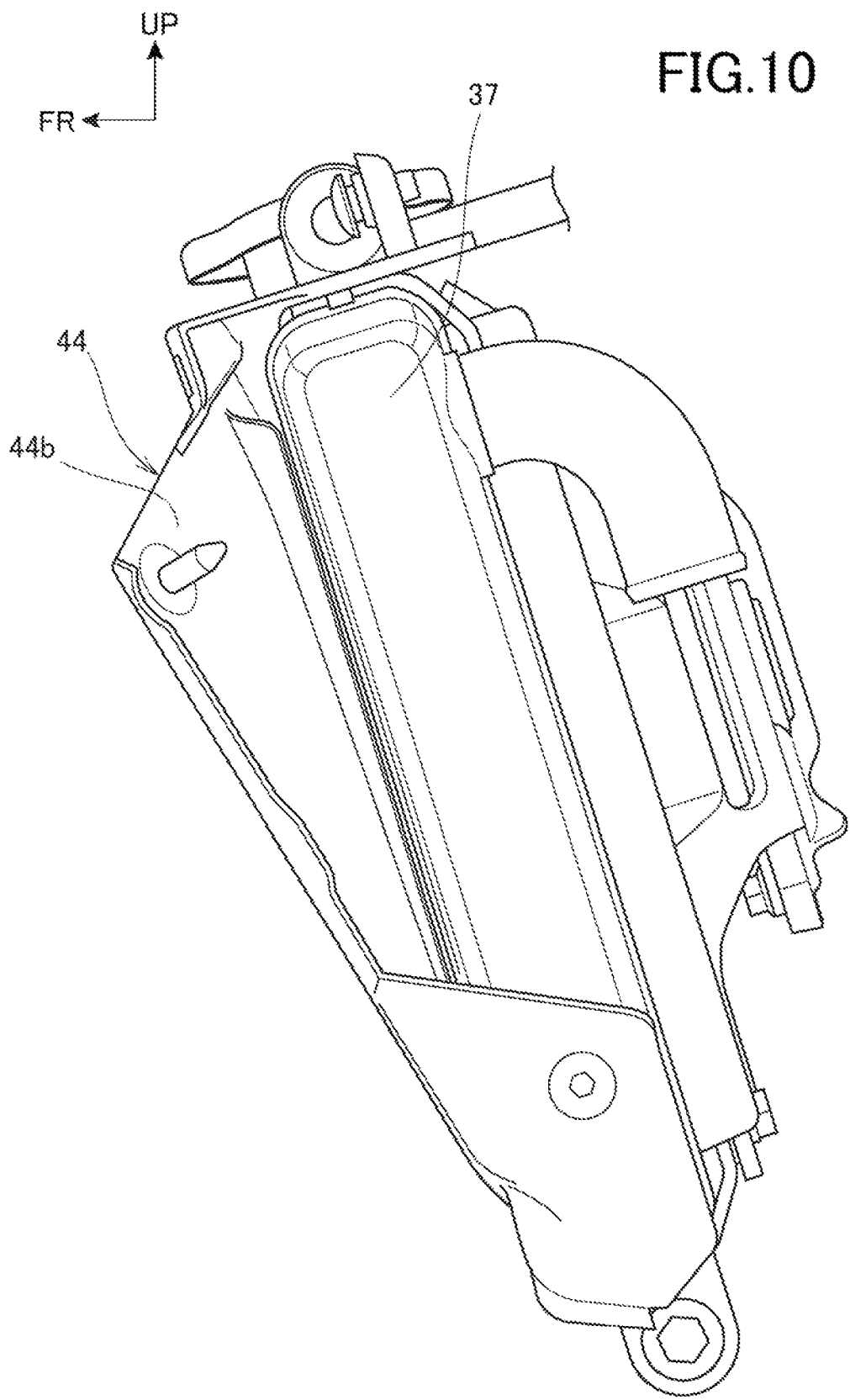
FIG. 10 is a left side view of a radiator to which a radiator grill is attached.

FIG. 10 is a left side view of the radiator 37 to which the radiator grill 44 is attached.

Referring to FIGS. 2, 3, and 10, the front surface of the radiator 37 is a guide surface of air (running wind) of the radiator 37.

The radiator grill 44 includes: a plate-shaped mesh portion 44a covering the front surface of the radiator 37 from the front side; and a pair of left and right wind guide plates 44b extending outward in the vehicle width direction from the respective left and right edges of the mesh portion 44a.

The mesh portion 44a has a rectangular shape covering substantially the entire front surface of the radiator 37. The mesh portion 44a includes many apertures and is air permeable.

The wind guide plate 44b is disposed over substantially the entire length of the mesh portion 44a in the up-down direction.

The wind guide plate 44b inclines and extends forward and outward in the vehicle width direction.

Part of the running wind moving from the front toward the radiator 37 flows rearward and inward in the vehicle width direction along the inclined front surface of the wind guide plate 44b and is guided to the mesh portion 44a. Therefore, the wind guide plate 44b enables the running wind to efficiently flow in the radiator 37.

Referring to FIGS. 1 and 3, a canister 90 storing evaporated fuel is disposed behind the power unit 12 and directly under the seat 17.

The canister 90 is connected to the fuel tank 29 through piping. The evaporated fuel of the fuel tank 29 is adsorbed onto an adsorbent, such as activated charcoal, provided inside the cylinder-shaped canister 90.

Figure 11:
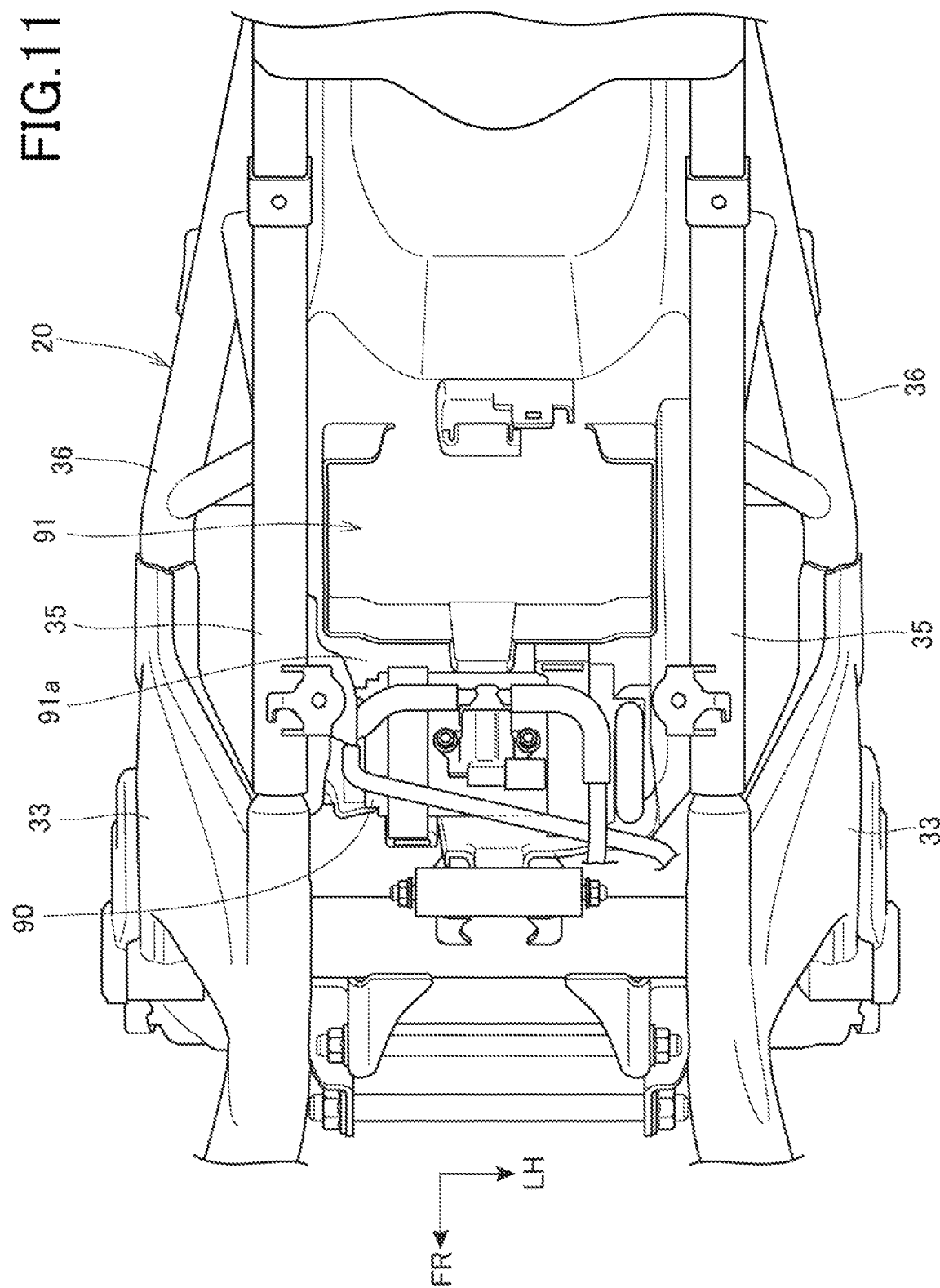
FIG. 11 is a plan view showing a support structure of a canister.

FIG. 11 is a plan view showing the support structure of the canister 90.

A plate-shaped fender 91 is disposed between the left and right seat frames 35. The fender 91 closes substantially the entire space between the left and right seat frames 35 in the vehicle width direction.

The fender 91 extends from the front end portion of the seat frame 35 to its rear end portion. The fender 91 covers the rear wheel 15 from above.

The front end portion of the fender 91 is provided with a tray-shaped canister housing 91a opening upward. The canister 90 is disposed in the canister housing 91a and fixed to the canister housing 91a. The canister 90 is disposed such that the axial direction of the canister 90 coincides with the vehicle width direction.

As described above, according to the embodiment to which the present invention is applied, the intake system 50 takes air through the air inlet ducts 53 and 54 extending from the air cleaner case 51, and includes the vortex generator 55 that causes the flow of the intake air inside each of the air inlet ducts 53 and 54 to rotate around the corresponding one of the axes 53a and 54a of the air inlet ducts 53 and 54.

According to this configuration, the vortex generator 55 causes the intake air W of each of the air inlet ducts 53 and 54 to be a vortex rotating around the corresponding one of axes 53a and 54a of the air inlet ducts 53 and 54, and such a vortex flow flows in the air cleaner case 51. This increases the flow rate of the intake air W, possibly improving intake efficiency.

The air inlet ducts 53 and 54 include their respective distal end portions provided with the respective intake openings 53b and 54b that take the intake air into the respective air inlet ducts 53 and 54, and the vortex generator 55 is disposed at each of the intake openings 53b and 54b.

This configuration can generate the vortex flows from positions where the intake openings 53b and 54b take the intake air W into the respective air inlet ducts 53 and 54, thereby efficiently generating vortex flows in the air inlet ducts 53 and 54.

The interior of the air cleaner case 51 is divided by the air filter 59 that purifies the intake air, the air inlet ducts 53 and 54 are disposed upstream of the air filter 59 in a left and right pair relative to the air cleaner case 51, and the air cleaner case 51 includes, in a left and right pair, the duct connection openings 60d and 60e facing each other, each of the air inlet ducts 53 and 54 being connected to the corresponding one of the left and right duct connection openings 60d and 60e.

This configuration can dispose the air inlet ducts 53 and 54 on the left and right of the air cleaner case 51, respectively, at the upstream side of the air filter 59 in a well-balanced manner.

Further, each of the air inlet ducts 53 and 54 includes: the corresponding one of the outer duct portions 63 and 73 extending outward from the air cleaner case 51; and the corresponding one of the inner duct portions 64 and 74 extending inside the air cleaner case 51, the vortex generator 55 is disposed in each of the outer duct portions 63 and 73, and the inner duct portions 64 and 74 respectively have the downstream ends 64a and 74a opening toward the air filter 59.

This configuration allows the vortex flows flowing in the air inlet ducts 53 and 54 with a large flow rate to flow from the respective downstream ends 64a and 74a of the inner duct portions 64 and 74 toward the air filter 59. This improves intake efficiency. In addition, the air inlet ducts 53 and 54 can be elongated, thereby reducing intake noise.

The air inlet ducts 53 and 54 are provided in a left and right pair, the vortex generator 55 is provided in each of the left and right air inlet ducts 53 and 54, and the left and right vortex generators 55 cause the flows of the intake air to rotate in the same direction.

According to this configuration, rotations of the vortical intake air W flowing in the left and right air inlet ducts 53 and 54 are in the same direction, and this can promote rotations of the vortical intake air W to improve intake efficiency.

The intake system 50 is mounted in the saddle-ride vehicle 10, the saddle-ride vehicle 10 includes the radiator shroud 40 covering the radiator 37 from the side, the radiator shroud 40 includes a portion covering the intake openings 53b and 54b, and the vortex generator 55 is integrally formed with the radiator shroud 40.

This configuration can provide the vortex generator 55 with a simple structure using the radiator shroud 40.

The saddle-ride vehicle 10 includes the fuel tank 29 and the tank cover 39 covering at least a portion of the fuel tank 29, the tank cover 39 covers the intake openings 53b and 54b from the vehicle front side and the outer side in the vehicle width direction and includes a cover aperture 42c opening forward, the radiator shroud 40 includes the partition wall 84 behind the cover aperture 42c and before each of the intake openings 53b and 54b, and the partition wall 84 includes the opening 84a allowing the running wind from the cover aperture 42c to flow rearward.

This configuration enables the running wind flowing from the cover aperture 42c of the tank cover 39 into the tank cover 39 to flow into each of the intake openings 53b and 54b through the opening 84a of the partition wall 84.

The air inlet ducts 53 and 54 are disposed above the opening 84a.

This configuration separates the opening 84a from the air inlet ducts 53 and 54 in the up-down direction. Thus, air (running wind) can be stored in the tank cover 39 between the opening 84a and the air inlet ducts 53 and 54, increasing the amount of the air flowing through the air inlet ducts 53 and 54.

The intake system 50 is mounted in the saddle-ride vehicle 10, each of the air inlet ducts 53 and 54 extends outward in the vehicle width direction from the air cleaner case 51, and the vortex generator 55 includes: the inlet aperture 86c communicating with the corresponding one of the intake openings 53b and 54b; and the guide 87 extending forward from the inlet aperture 86c. The inlet aperture 86c opens toward the lower side that is one side of the upper and lower sides, and the guide 87 includes: the first guide wall 87a extending in the vehicle front-rear direction at the lower side relative to the inlet aperture 86c; and the second guide wall 87b connecting the rear end of the first guide wall 87a to the rear end portion of the inlet aperture 86c.

This configuration changes the direction of the intake air W flowing rearward along the first guide wall 87a to the up-down direction along the second guide wall 87b, and flows into each of the air inlet ducts 53 and 54 from the inlet aperture 86c. This can generate the flow rotating around each of the axes 53a and 54a of the air inlet ducts 53 and 54.

The second guide wall 87b is arc-shaped along the inner circumference of each of the air inlet ducts 53 and 54 when viewed along the axial direction of each of the air inlet ducts 53 and 54.

This configuration allows the arc-shaped second guide wall 87b provided along the inner circumference of each of air inlet ducts 53 and 54 to efficiently generate the flow rotating around each of the axes 53a and 54a of the air inlet ducts 53 and 54.

The vortex generator 55 includes a side wall 86b that is a slope disposed downstream of the inlet aperture 86c and inclining inward in the vehicle width direction along the rotation direction of the intake air W rotated by the vortex generator 55.

According to this configuration, the side wall 86b allows the vortical intake air W to efficiently move inward in the vehicle width direction along the axial direction of each of the air inlet ducts 53 and 54.

The intake air W flowing along the guide 87 flows along the first guide wall 87a and the second guide wall 87b when viewed along the axial direction of each of the air inlet ducts 53 and 54 to change its flow direction by 70° or more, thereby allowing the intake air W to flow into the inlet aperture 86c.

This configuration allows the intake air W to flow along the first guide wall 87a and the second guide wall 87b to change its flow direction by 70° or more, thereby allowing the intake air W to flow into the inlet aperture 86c. This can efficiently generate the vortex flow.

The saddle-ride vehicle 10 includes the radiator shroud 40 covering the radiator 37 from the side, the radiator shroud 40 includes a portion covering each of the intake openings 53b and 54b, and the vortex generator 55 is integrally formed with the radiator shroud 40. The saddle-ride vehicle 10 includes the fuel tank 29 and the tank cover 39 covering at least a portion of the fuel tank 29, the tank cover 39 covers the intake openings 53b and 54b from the vehicle front side and the outer side in the vehicle width direction and includes the cover aperture 42c opening forward, the radiator shroud 40 includes the partition wall 84 behind the cover aperture 42c and before each of the intake openings 53b and 54b, and the partition wall 84 includes the opening 84a allowing the running wind from the cover aperture 42c to flow rearward. The inlet aperture 86c opens toward the lower side, the first guide wall 87a extends in a vehicle front-rear direction at the lower side relative to the inlet aperture 86c, and the second guide wall 87b extends upward from the first guide wall 87a toward the rear end portion of the inlet aperture 86c, and the opening 84a is disposed below the inlet aperture 86c and before the first guide wall 87a.

According to this configuration, the first guide wall 87a and the second guide wall 87b guide the running wind passing through the opening 84a of the partition wall 84 rearward and upward, allowing the running wind to efficiently flow into the inlet aperture 86c.

The above embodiment indicates one aspect to which the present invention is applied, but the present invention is not limited to the above embodiment.

In the above embodiment, the inlet aperture 86c opens toward the lower side, and the guide 87 includes: the first guide wall 87a extending in vehicle front-rear direction at the lower side relative to the inlet aperture 86c; and the second guide wall 87b connecting the rear end of the first guide wall 87a and the rear end portion of the inlet aperture 86c. However, the present invention is not limited thereto. For example, the inlet aperture may open toward the upper side, and the guide may includes: a first guide wall extending in vehicle front-rear direction at the upper side relative to the inlet aperture; and a second guide wall extending downward from the first guide wall and connecting the rear end of the first guide wall to the rear end portion of the inlet aperture.

In the above embodiments, a motorcycle has been described as an example of the saddle-ride vehicle 10. However, the present invention is not limited to a motorcycle, and is also applicable to a three-wheeled saddle-ride vehicle including two front wheels or two rear wheels or to a saddle-ride vehicle including four or more wheels.

Second Embodiment

A second embodiment to which the present invention is applied will be described below with reference to FIGS. 12 to 14. In the second embodiment, the same components as those in the first embodiment described above are denoted by the same reference numerals and will not be described.

The second embodiment is different from the above embodiment in terms of, e.g., providing a vortex generation member 255 (vortex generator) different from the vortex generator 55 in shape.

Figure 12:
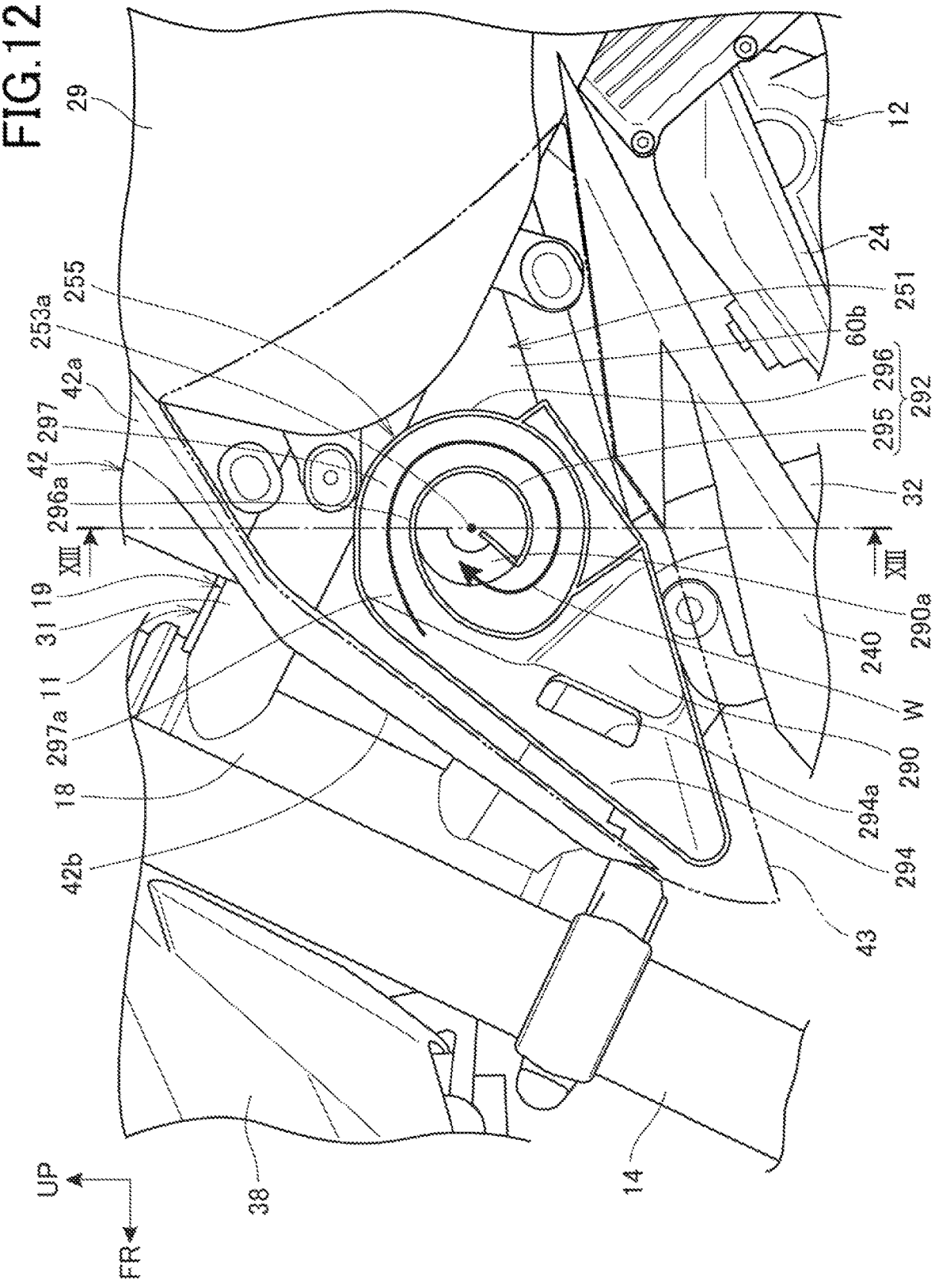
FIG. 12 is a left side view of surroundings of a vortex generation member of a second embodiment.

FIG. 12 is a left side view of surroundings of the vortex generation member 255 of the second embodiment. FIG. 13 is a cross-sectional view taken along line XIII-XIII of FIG. 12.

FIG. 14 is a view of the schematic internal structure of the air cleaner case 251 when viewed from the left side.

Figure 13:
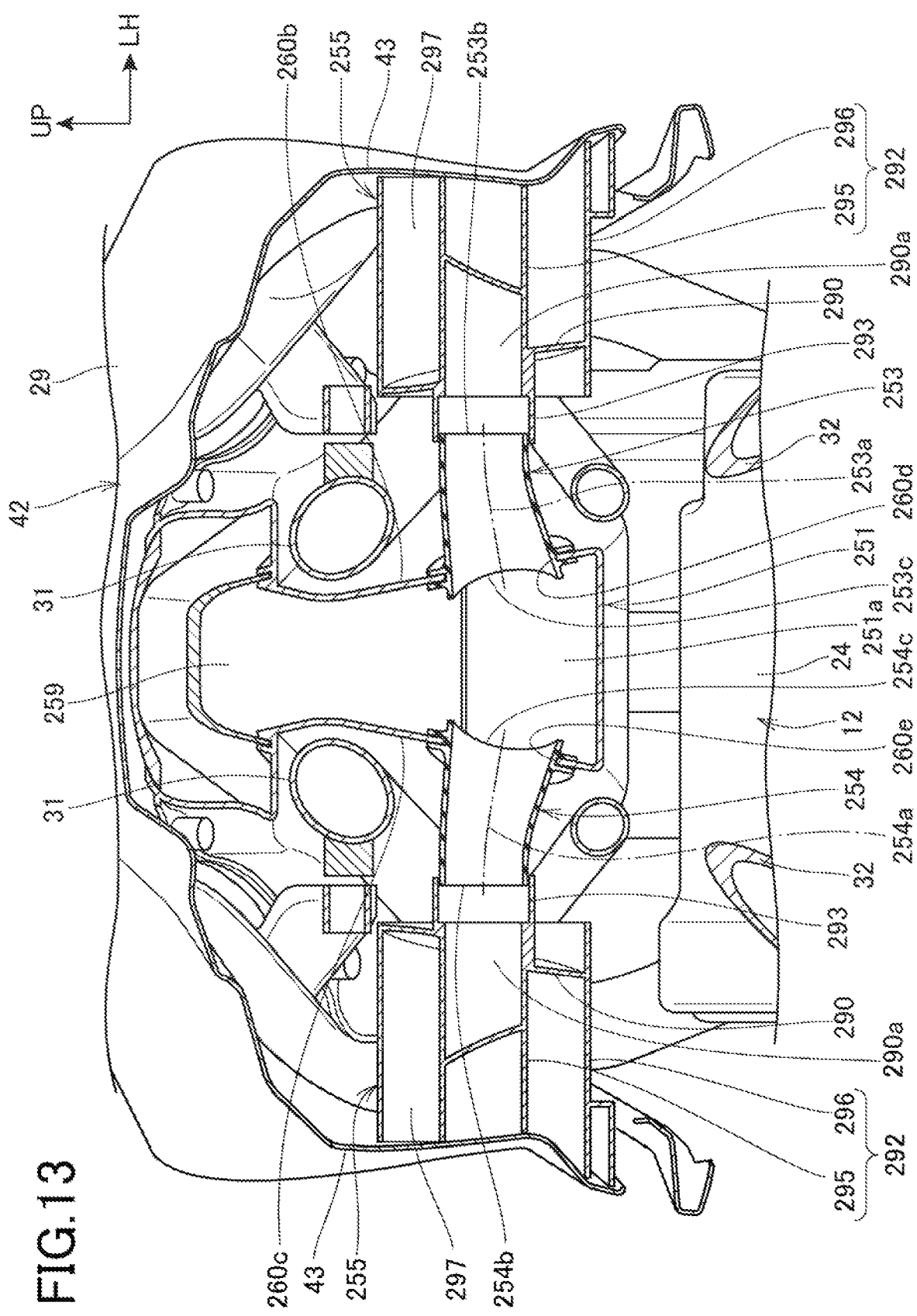
FIG. 13 is a cross-sectional view taken along line XIII-XIII of FIG. 12.

Referring to FIGS. 12 to 14, the box-shaped, air cleaner case 251 includes therein an air filter 259 that purifies intake air. The air filter 259 divides the space inside the air cleaner case 251 in the front-rear direction.

In the air cleaner case 251, the space before the air filter 259 is a dirty side 251a where the intake air that has not passed through the air filter 259 flows in. In the air cleaner case 251, the space behind the air filter 259 is a clean side 251b where the intake air that has passed through the air filter 259 flows in.

The supply duct 262 extends downward from the clean side 251b to be connected to the throttle device 52.

To the air cleaner case 251, a pair of left and right air inlet ducts 253 and 254 are connected.

The left air inlet duct 253 extends outward in the vehicle width direction from a side wall 260b on the left of the air cleaner case 251.

The right air inlet duct 254 extends outward in the vehicle width direction from a side wall 260c on the right of the air cleaner case 251.

The side wall 260b is provided with a duct connection opening 260d to which the air inlet duct 253 is mated and connected.

The side wall 260c is provided with a duct connection opening 260e to which the air inlet duct 254 is mated and connected.

The duct connection openings 260d and 260e are positioned before and below the air filter 259 in the dirty side 251a.

The air filter 259 is plate-shaped and extends in the up-down direction at a position behind and above the duct connection openings 260d and 260e.

The duct connection openings 260d and 260e face each other. In other words, when viewed from the vehicle side, the duct connection openings 260d and 260e at least partially overlap each other.

The air inlet duct 253 has a downstream end 253c opening to the dirty side 251a at the duct connection opening 260d.

The air inlet duct 254 has a downstream end 254c opening to the dirty side 251a at the duct connection opening 260e.

The downstream ends 253c and 254c face each other.

The air inlet duct 253 has an axis 253a and the air inlet duct 254 has an axis 254a, the axes 253a and 254a extending in the vehicle width direction.

The air inlet duct 253 includes, at its distal end in the outer side in the vehicle width direction, an intake opening 253b that takes air into the air inlet duct 253.

The air inlet duct 254 includes, at its distal end in the outer side in the vehicle width direction, an intake opening 254b that takes air into the air inlet duct 254.

The radiator shroud 240 covers the radiator 37 at a position below the tank cover 39 from the outer side in the vehicle width direction.

In the interior of the tank cover 39, the vortex generation members 255 are provided in a left and right pair.

Each vortex generation member 255 is disposed behind the lower extension 42b of the first tank cover 42, and is covered with the second tank cover 43 from the outer side in the vehicle width direction.

The left vortex generation member 255 covers the intake opening 253b from the outer side in the vehicle width direction. The right vortex generation member 255 covers the intake opening 254b from the outer side in the vehicle width direction.

The left vortex generation member 255 includes: a side wall 290 disposed outside the intake opening 253b in the vehicle width direction; a cylinder portion 293 extending inward in the vehicle width direction from the side wall 290; a guide wall 292 extending outward in the vehicle width direction from the side wall 290; and a front wall 294 extending outward in the vehicle width direction from the front edge of the side wall 290.

The outer end of the cylinder portion 293 in the vehicle width direction is a side wall opening 290a penetrating the side wall 290 in the vehicle width direction. The side wall opening 290a communicates with the intake opening 253b.

The inner end of the cylinder portion 293 in the vehicle width direction is mated to the intake opening 253b from the outer side in the vehicle width direction, thereby allowing the vortex generation member 255 to be connected to the air inlet duct 253. That is to say, the vortex generation member 255 is disposed at the intake opening 253b.

The guide wall 292 is a spiral wall provided so as to surround the side wall opening 290a when viewed from the vehicle side.

Specifically, the guide wall 292 includes: an inner guide wall 295 extending outward in the vehicle width direction along the circumference of the side wall opening 290a; and an outer guide wall 296 surrounding the inner guide wall 295 from its surroundings.

The inner guide wall 295 is, when viewed from the vehicle side, semi-cylindrically shaped and provided at substantially the rear half portion of the circumference of the side wall opening 290a. Therefore, the front surface of the inner guide wall 295 opens forward.

The outer guide wall 296 extends from a beginning portion 296a, that is the upper end of the inner guide wall 295 when viewed from the vehicle side, to a position before and below the side wall opening 290a, then, rotates counterclockwise around the inner guide wall 295, and extends to a position above the beginning portion 296a.

The passage formed between the outer guide wall 296 and the inner guide wall 295 is an intake guide passage 297 that guides intake air. The intake guide passage 297 has an inlet 297a above the side wall opening 290a. The intake guide passage 297, when viewed from the vehicle side, spirally rotates clockwise around the axis 253a of the air inlet duct 253 along the circumference of the side wall opening 290a.

The front wall 294 is disposed before the guide wall 292. The front wall 294 has a lower portion provided with an opening 294a. The opening 294a is positioned before and below the side wall opening 290a and the guide wall 292.

The right vortex generation member 255 is substantially symmetrical to the left vortex generation member 255, and thus, the specific description of the right vortex generation member 255 will not be described.

The cylinder portion 293 of the right vortex generation member 255 is connected to the intake opening 254b of the right air inlet duct 254.

The running wind flowing from the over aperture 42c (FIG. 2) into the tank cover 39 passes through the opening 294a of the front wall 294 to flow into the vortex generation member 255. Part of the running wind flowing into the vortex generation member 255 flows into the above intake guide passage 297 as intake air W (FIG. 12).

The intake air W passes through the intake guide passage 297, thereby rotating around the side wall opening 290a when viewed from the vehicle side, and then flowing into the side wall opening 290a.

Specifically, the intake air W passing through the intake guide passage 297 becomes a vortex rotating clockwise around the axis 253a of the air inlet duct 253 when viewed from the vehicle side.

The vortical intake air W that has flowed in the side wall opening 290a flows inward in the vehicle width direction along an axial direction of the air inlet duct 253 while rotating clockwise in the air inlet duct 253 to flow in the dirty side 251a.

Similarly, the right vortex generation member 255 also causes the intake air W (now shown) to be a vortex rotating around the axis 254a of the air inlet duct 254 when viewed from the vehicle side. When viewed from the right side of the vehicle, the intake air W generated in the right vortex generation member 255 rotates counterclockwise. In other words, when viewed from the left side of the vehicle like FIG. 12, the vortexes of the intake air W generated in the left and right vortex generation members 255 rotate clockwise, and thus, the rotation directions of the vortexes generated in the left and right vortex generation members 255 are the same.

In the right vortex generation member 255, the vortical intake air W that has flowed in the side wall opening 290a flows inward in the vehicle width direction along an axial direction of the air inlet duct 254 while rotating clockwise when viewed from the left side of the vehicle to flow into the dirty side 251a.

Referring to FIGS. 13 and 14, when viewed from the left side of the vehicle, the intake air W flowing into the dirty side 251a from each of the duct connection openings 260d and 260e rotates clockwise. This can promote rotation of the intake air W. In addition, the duct connection openings 260d and 260e face each other, and thus, the intake air W from the duct connection opening 260d and the intake air W from the duct connection opening 260e are easily mixed to possibly promote rotation of the intake air W.

The intake air W rotates clockwise in the dirty side 251a when viewed from the left side of the vehicle, and thus, is likely to flow upward and rearward along inner surfaces of a front wall 251c and upper wall 251d of the dirty side 251a. This enables the intake air W in the dirty side 251a to efficiently flow to the air filter 259.

As described above, according to the second embodiment to which the present invention is applied, the air inlet ducts 253 and 254 respectively have downstream ends 253c and 254c opening to the interior of the air cleaner case 251 at the respective duct connection openings 260d and 260e.

This configuration allows the vortical intake air W rotating around each of the axes 253a and 254a to flow from each of the duct connection openings 260d and 260e into the air cleaner case 251 and flow to the air filter 259 along the inner surface of the air cleaner case 251. This enables the intake air W to efficiently flow in the air filter 259 using the vortex flows of the intake air W in the air cleaner case 251.

Configurations Supported by Above Embodiments

The above embodiments support the following configurations.

(Configuration 1) An intake system that takes air through at least one air inlet duct extending from an air cleaner case includes at least one vortex generator that causes a flow of intake air inside the air inlet duct to rotate around the axis of the air inlet duct.

According to this configuration, the vortex generator causes the intake air of the air inlet ducts to be a vortex rotating around the axis of the air inlet duct, and such a vortex flow flows in the air cleaner case. This increases the flow rate of the intake air, possibly improving intake efficiency.

(Configuration 2) The intake system according to configuration 1, wherein the air inlet duct has a distal end portion provided with an intake opening that takes the intake air into the air inlet duct, and the vortex generator is disposed at the intake opening.

This configuration can generate the vortex flow from a position where the intake opening takes the intake air into the air inlet duct, thereby efficiently generating the vortex flow in the air inlet duct.

(Configuration 3) The intake system according to configuration 1 or 2, wherein an interior of the air cleaner case is divided by an air filter that purifies the intake air, the air inlet duct includes, relative to the air cleaner case, a pair of left and right air inlet ducts disposed upstream of the air filter, and the air cleaner case includes a pair of left and right duct connection openings facing each other, each of the inlet ducts being connected to a corresponding one of the left and right duct connection openings.

This configuration can dispose the air inlet ducts on the respective left and right of the air cleaner case at the upstream side of the air filter in a well-balanced manner.

(Configuration 4) The intake system according to configuration 3, wherein each of the air inlet ducts has a downstream end opening to an interior of the air cleaner case at a corresponding one of the duct connection openings.

This configuration allows the vortical intake air rotating around each axis to flow from each duct connection opening into the inside and flow to the air filter along the inner surface of the air cleaner case. This enables the intake air to efficiently flow in the air filter using the vortex flows of the intake air in the air cleaner case.

(Configuration 5) The intake system according to configuration 3, wherein each of the air inlet ducts includes: an outer duct portion extending outward from the air cleaner case; and an inner duct portion extending inside the air cleaner case, the vortex generator is disposed in the outer duct portion, and the inner duct portion has a downstream end opening toward the air filter.

This configuration allows the vortex flow flowing in each of the air inlet ducts with a large flow rate to flow from the downstream end of the inner duct portion toward the air filter. This improves intake efficiency. In addition, the air inlet ducts can be elongated, thereby reducing intake noise.

(Configuration 6) The intake system according to any one of configurations 1 to 5, wherein the air inlet duct includes a pair of left and right air inlet ducts, the vortex generator includes a pair of left and right vortex generators each of which is disposed in a corresponding one of the left and right air inlet ducts, and the left and right vortex generators cause flows of the intake air in the same direction.

According to this configuration, rotations of the vortical intake air flowing in the left and right air inlet ducts are in the same direction, and this can promote rotations of the vortical intake air to improve intake efficiency.

(Configuration 7) The intake system according to configuration 2, wherein the intake system is mounted in the saddle-ride vehicle, the saddle-ride vehicle includes a radiator shroud covering a radiator from a side, the radiator shroud includes a portion covering the intake opening, and the vortex generator is integrally formed with the radiator shroud.

This configuration can provide the vortex generator with a simple structure using the radiator shroud.

(Configuration 8) The intake system according to configuration 7, wherein the saddle-ride vehicle includes a fuel tank and a tank cover covering at least a portion of the fuel tank, the tank cover covers the intake opening from a vehicle front side and an outer side in a vehicle width direction and includes a cover aperture opening forward, the radiator shroud includes a partition wall behind the cover aperture and before the intake opening, and the partition wall includes an opening allowing running wind from the cover aperture to flow rearward.

This configuration enables the running wind flowing from the cover aperture of the tank cover into the tank cover to flow into the intake opening through the opening of the partition wall.

(Configuration 9) The intake system according to configuration 8, wherein the air inlet duct is disposed above the opening.

This configuration separates the opening from the air inlet duct in the up-down direction, thus increasing the amount of the air flowing through the air inlet duct.

(Configuration 10) The intake system according to configuration 2, wherein the intake system is mounted in the saddle-ride vehicle, the air inlet duct extends outward in a vehicle width direction from the air cleaner case, the vortex generator includes: an inlet aperture communicating with the intake opening; and a guide extending forward from the inlet aperture, the inlet aperture opens toward one side of upper and lower sides, and the guide includes: a first guide wall extending in a vehicle front-rear direction at the one side relative to the inlet aperture; and a second guide wall connecting a rear end of the first guide wall to a rear end portion of the inlet aperture.

This configuration changes the direction of the intake air flowing rearward along the first guide wall to the up-down direction along the second guide wall, and flows into the air inlet duct from the inlet aperture. This can generate the flow rotating around the axis of the air inlet duct.

(Configuration 11) The intake system according to configuration 10, wherein the second guide wall is arc-shaped along an inner circumference of the air inlet duct when viewed along an axial direction of the air inlet duct.

This configuration allows the arc-shaped second guide wall provided along the inner circumference of each of air inlet ducts to efficiently generate the flow rotating around the axis of the air inlet duct.

(Configuration 12) The intake system according to configuration 10 or 11, wherein the vortex generator includes a slope disposed downstream of the inlet aperture and inclining inward in a vehicle width direction along a rotation direction of the intake air rotated by the vortex generator.

According to this configuration, the slope allows the vortical intake air to efficiently move inward in the vehicle width direction along the axial direction of the air inlet duct.

(Configuration 13) The intake system according to any one of configurations 10 to 12, wherein the intake air flowing along the guide flows along the first guide wall and the second guide wall when viewed along an axial direction of the air inlet duct to change a flow direction of the intake air by 70° or more, thereby allowing the intake air to flow into the inlet aperture.

This configuration allows the intake air to flow along the first guide wall and the second guide wall to change its flow direction by 70° or more, thereby allowing the intake air to flow into the inlet aperture. This can efficiently generate the vortex flow.

(Configuration 14) The intake system according to any one of configurations 10 to 13, wherein the saddle-ride vehicle includes a radiator shroud that covers a radiator from a side, the radiator shroud includes a portion covering the intake opening, the vortex generator is integrally formed with the radiator shroud, the saddle-ride vehicle includes a fuel tank and a tank cover covering at least a portion of the fuel tank, the tank cover covers the intake openings from a vehicle front side and an outer side in the vehicle width direction and includes a cover aperture opening forward, the radiator shroud includes a partition wall behind the cover aperture and before the intake opening, the partition wall includes an opening allowing running wind from the cover aperture to flow rearward, the inlet aperture opens toward the lower side, and the first guide wall extends in a vehicle front-rear direction at the lower side relative to the inlet aperture, and the second guide wall extends upward from the first guide wall toward the rear end portion of the inlet aperture, and the opening is disposed below the inlet aperture and before the first guide wall.

According to this configuration, the first guide wall and the second guide wall guide the running wind passing through the opening of the partition wall rearward and upward, allowing the running wind to efficiently flow into the inlet aperture.

REFERENCE SIGNS LIST

10 Saddle-Ride Vehicle
29 Fuel Tank

37 Radiator
39 Tank Cover
40 Radiator Shroud
42c Cover Aperture
50 Intake system
51, 251 Air Cleaner Case
53, 54 Air Inlet Duct
53a, 54a Axis
53b, 54b Intake Opening
55 Vortex Generator
59, 259 Air Filter
60d, 60e Duct Connection Opening
63, 73 Outer Duct Portion
64, 74 Inner Duct Portion
64a, 74a Downstream End
84 Partition Wall
84a Opening
86b Side Wall (Slope)
86c Inlet Aperture
87 Guide
87a First Guide Wall
87b Second Guide Wall
253, 254 Air Inlet Duct
253a, 254a Axis
253b, 254b Intake Opening
253c, 254c Downstream End
255 Vortex Generation Member (Vortex Generator)
260d, 260e Duct Connection Opening

What is claimed is:

1. An intake system that takes air through at least one air inlet duct extending from an air cleaner case, the system comprising
at least one vortex generator that causes a flow of intake air inside the air inlet duct to rotate around an axis of the air inlet duct,
the air inlet duct has a distal end portion provided with an intake opening that takes the intake air into the air inlet duct,
the vortex generator is disposed at the intake opening,
the intake system is mounted in a saddle-ride vehicle,
the saddle-ride vehicle includes a radiator shroud covering a radiator from a side,
the radiator shroud includes a portion covering the intake opening, and
the vortex generator is integrally formed with the radiator shroud.

2. The intake system according to claim 1, wherein
an interior of the air cleaner case is divided by an air filter that purifies the intake air,
the air inlet duct includes, relative to the air cleaner case, a pair of left and right air inlet ducts disposed upstream of the air filter, and
the air cleaner case includes a pair of left and right duct connection openings facing each other, each of the air inlet ducts being connected to a corresponding one of the left and right duct connection openings.

3. The intake system according to claim 2, wherein
each of the air inlet ducts has a downstream end opening to an interior of the air cleaner case at a corresponding one of the duct connection openings.

4. The intake system according to claim 2, wherein
each of the air inlet ducts includes: an outer duct portion extending outward from the air cleaner case; and an inner duct portion extending inside the air cleaner case,
the vortex generator is disposed in the outer duct portion, and
the inner duct portion has a downstream end opening toward the air filter.

5. The intake system according to claim 1, wherein
the air inlet duct includes a pair of left and right air inlet ducts,
the vortex generator includes a pair of left and right vortex generators each of which is disposed in a corresponding one of the left and right air inlet ducts, and
the left and right vortex generators cause flows of the intake air to rotate in a same direction.

6. The intake system according to claim 1, wherein
the saddle-ride vehicle includes a fuel tank and a tank cover covering at least a portion of the fuel tank,
the tank cover covers the intake opening from a vehicle front side and an outer side in a vehicle width direction and includes a cover aperture opening forward,
the radiator shroud includes a partition wall behind the cover aperture and before the intake opening, and
the partition wall includes an opening allowing running wind from the cover aperture to flow rearward.

7. The intake system according to claim 6, wherein
the air inlet duct is disposed above the opening.

8. An intake system that takes air through at least one air inlet duct extending from an air cleaner case, the system comprising
at least one vortex generator that causes a flow of intake air inside the air inlet duct to rotate around an axis of the air inlet duct,
the air inlet duct has a distal end portion provided with an intake opening that takes the intake air into the air inlet duct,
the vortex generator is disposed at the intake opening,
the intake system is mounted in a saddle-ride vehicle,
the air inlet duct extends outward in a vehicle width direction from the air cleaner case,
the vortex generator includes: an inlet aperture communicating with the intake opening; and a guide extending forward from the inlet aperture,
the inlet aperture opens toward one side of upper and lower sides, and
the guide includes: a first guide wall extending in a vehicle front-rear direction at the one side relative to the inlet aperture; and a second guide wall connecting a rear end of the first guide wall to a rear end portion of the inlet aperture.

9. The intake system according to claim 8, wherein
the second guide wall is arc-shaped along an inner circumference of the air inlet duct when viewed along an axial direction of the air inlet duct.

10. The intake system according to claim 8, wherein
the vortex generator includes a slope disposed downstream of the inlet aperture and inclining inward in the vehicle width direction along a rotation direction of the intake air rotated by the vortex generator.

11. The intake system according to claim 8, wherein
the intake air flowing along the guide flows along the first guide wall and the second guide wall when viewed along an axial direction of the air inlet duct to change a flow direction of the intake air by 70° or more, thereby allowing the intake air to flow into the inlet aperture.

12. The intake system according to claim 8, wherein
the saddle-ride vehicle includes a radiator shroud covering a radiator from a side,
the radiator shroud includes a portion covering the intake opening, the vortex generator is integrally formed with the radiator shroud, the saddle-ride vehicle includes a fuel tank and a tank cover covering at least a portion of the fuel tank, the tank cover covers the intake openings from a vehicle front side and an outer side in the vehicle width direction and includes a cover aperture opening forward, the radiator shroud includes a partition wall behind the cover aperture and before the intake opening, the partition wall includes an opening allowing running wind from the cover aperture to flow rearward, the inlet aperture opens toward the lower side, the first guide wall extends in a vehicle front-rear direction at the lower side relative to the inlet aperture, and the second guide wall extends upward from the first guide wall toward the rear end portion of the inlet aperture, and the opening is disposed below the inlet aperture and before the first guide wall.

\* \* \* \* \*